US012216229B2

(12) United States Patent
Santra et al.

(10) Patent No.: US 12,216,229 B2
(45) Date of Patent: *Feb. 4, 2025

(54) PARAMETRIC CNN FOR RADAR PROCESSING

(71) Applicant: Infineon Technologies AG, Neubiberg (DE)

(72) Inventors: Avik Santra, Irvine, CA (US); Thomas Reinhold Stadelmayer, Wenzenbach (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,521

(22) Filed: Aug. 29, 2023

(65) Prior Publication Data

US 2023/0408649 A1  Dec. 21, 2023

Related U.S. Application Data

(63) Continuation of application No. 16/905,335, filed on Jun. 18, 2020, now Pat. No. 11,774,553.

(51) Int. Cl.
  *G01S 7/41* (2006.01)
  *G01S 13/89* (2006.01)
  (Continued)

(52) U.S. Cl.
  CPC .............. *G01S 7/417* (2013.01); *G01S 7/412* (2013.01); *G01S 7/415* (2013.01); *G01S 13/89* (2013.01);
  (Continued)

(58) Field of Classification Search
  CPC .......... G01S 7/417; G01S 7/412; G01S 7/415; G01S 13/89; G01S 7/285; G01S 7/352;
  (Continued)

(56) References Cited

U.S. PATENT DOCUMENTS 4,241,347 A   12/1980  Albanese et al.
5,067,164 A *  11/1991  Denker ................. G06N 3/04
                                            706/31
(Continued)

FOREIGN PATENT DOCUMENTS

CN   1463161 A   12/2003
CN   1716695 A    1/2006
(Continued)

OTHER PUBLICATIONS

Constrained Convolutional Neural Networks: A New Approach Towards General Purpose Image Manipulation Detection [NPL, 2018] (Year: 2018).*

(Continued)

*Primary Examiner* — Timothy A Brainard
*Assistant Examiner* — Ismaaeel A. Siddiquee
(74) *Attorney, Agent, or Firm* — Slater Matsil, LLP

(57) ABSTRACT

In an embodiment, a method includes: transmitting a plurality of radar signals using a millimeter-wave radar sensor towards a target; receiving a plurality of reflected radar signals that correspond to the plurality of transmitted radar signals using the millimeter-wave radar; mixing a replica of the plurality of transmitted radar signals with the plurality of received reflected radar signals to generate an intermediate frequency signal; generating raw digital data based on the intermediate frequency signal using an analog-to-digital converter; processing the raw digital data using a constrained L dimensional convolutional layer of a neural network to generate intermediate digital data, where L is a positive integer greater than or equal to 2, and where the neural network includes a plurality of additional layers; and processing the intermediate digital data using the plurality of additional layers to generate information about the target.

20 Claims, 14 Drawing Sheets

(51) Int. Cl.

| | | |
|---|---|---|
| G01S 7/285 | (2006.01) | |
| G01S 7/35 | (2006.01) | |
| G01S 13/02 | (2006.01) | |
| G01S 13/06 | (2006.01) | |
| G01S 13/32 | (2006.01) | |
| G01S 13/34 | (2006.01) | |
| G06N 3/045 | (2023.01) | |
| G06N 3/08 | (2023.01) | |

(52) U.S. Cl.
CPC ............ *G01S 7/285* (2013.01); *G01S 7/352* (2013.01); *G01S 2013/0245* (2013.01); *G01S 13/06* (2013.01); *G01S 13/32* (2013.01); *G01S 13/34* (2013.01); *G06N 3/045* (2023.01); *G06N 3/08* (2013.01)

(58) Field of Classification Search
CPC .......... G01S 13/06; G01S 13/32; G01S 13/34; G01S 2013/0245; G06N 3/045; G06N 3/08
See application file for complete search history.

(56) References Cited

U.S. PATENT DOCUMENTS

| | | | |
|---|---|---|---|
| 5,345,539 A * | 9/1994 | Webb | ................. G01S 7/417 342/350 |
| 6,147,572 A | 11/2000 | Kaminski et al. | |
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,245,250 B1 | 7/2007 | Kalayeh | |
| 7,317,417 B2 | 1/2008 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 9,886,095 B2 | 2/2018 | Pothier | |
| 9,935,065 B1 | 4/2018 | Baheti et al. | |
| 10,451,712 B1 * | 10/2019 | Madhow | ................. G01S 13/723 |
| 2003/0179127 A1 | 9/2003 | Wienand | |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0299433 A1 | 12/2011 | Darabi et al. | |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0316383 A1 * | 11/2015 | Donikian | ............ G01C 21/165 701/408 |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0034813 A1 * | 2/2016 | Hsu | ................. G06V 20/52 706/46 |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187462 A1 | 6/2016 | Altus et al. | |
| 2016/0191232 A1 | 6/2016 | Subburaj et al. | |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar Y.B. et al. | |
| 2016/0334502 A1 | 11/2016 | Ali et al. | |
| 2016/0349845 A1 | 12/2016 | Poupyrev et al. | |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |
| 2017/0141453 A1 | 5/2017 | Waelde et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0364160 A1 | 12/2017 | Malysa et al. | |
| 2018/0046255 A1 | 2/2018 | Rothera et al. | |
| 2018/0071473 A1 | 3/2018 | Trotta et al. | |
| 2018/0101239 A1 | 4/2018 | Yin et al. | |
| 2018/0115797 A1 * | 4/2018 | Wexler | ............. H04N 21/41407 |
| 2019/0122409 A1 * | 4/2019 | Meadows | ................. G06T 13/40 |

(56) References Cited

U.S. PATENT DOCUMENTS

| | | | | |
|---|---|---|---|---|
| 2019/0179674 | A1* | 6/2019 | Huang | G06N 3/048 |
| 2020/0077972 | A1* | 3/2020 | Yiu | A61B 8/488 |
| 2020/0301013 | A1 | 9/2020 | Banerjee | |
| 2020/0322377 | A1* | 10/2020 | Lakhdhar | G06F 17/18 |
| 2020/0326203 | A1* | 10/2020 | Lund | G08G 1/04 |
| 2020/0355817 | A1 | 11/2020 | Gillian et al. | |
| 2021/0081353 | A1 | 3/2021 | Eno et al. | |
| 2021/0342008 | A1* | 11/2021 | Sachidanandam | G06F 3/0346 |

FOREIGN PATENT DOCUMENTS

| | | | | |
|---|---|---|---|---|
| CN | 101231711 | A | * 7/2008 | |
| CN | 101490578 | A | 7/2009 | |
| CN | 101585361 | A | 11/2009 | |
| CN | 102788969 | A | 11/2012 | |
| CN | 102967854 | A | 3/2013 | |
| CN | 103529444 | A | 1/2014 | |
| CN | 203950036 | U | 11/2014 | |
| CN | 105841961 | A | * 8/2016 | G01M 13/045 |
| CN | 108898155 | A | 11/2018 | |
| DE | 102008054570 | A1 | 6/2010 | |
| DE | 102011100907 | A1 | 1/2012 | |
| DE | 102011075725 | A1 | 11/2012 | |
| DE | 102014118063 | A1 | 7/2015 | |
| EP | 3525000 | A1 | 8/2019 | |
| GB | 2247799 | A | 3/1992 | |
| JP | 2001174539 | A | 6/2001 | |
| JP | 2004198312 | A | 7/2004 | |
| JP | 2006234513 | A | 9/2006 | |
| JP | 2008029025 | A | 2/2008 | |
| JP | 2008089614 | A | 4/2008 | |
| JP | 2009069124 | A | 4/2009 | |
| JP | 2011529181 | A | 12/2011 | |
| JP | 2012112861 | A | 6/2012 | |
| JP | 2013521508 | A | 6/2013 | |
| JP | 2014055957 | A | 3/2014 | |
| KR | 20090063166 | A | 6/2009 | |
| KR | 20140082815 | A | 7/2014 | |
| WO | 2007060069 | A1 | 5/2007 | |
| WO | 2013009473 | A2 | 1/2013 | |
| WO | 2016033361 | A1 | 3/2016 | |

OTHER PUBLICATIONS

Robot Gesture Recognition using Millimetric-Wave Radar System (Year: 2018).*
A. Santra, R. V. Ulaganathan and T. Finke, "Short-Range Millimetric-Wave Radar System for Occupancy Sensing Application," in IEEE Sensors Letters, vol. 2, No. 3, pp. 1-4, Sep. 2018, doi: 10.1109/LSENS.2018.2852263. (Year: 2018).*
Santra, Avik et al., "Short-range multi-mode continuous-wave radar for vital sign measurement and imaging", ResearchGate, Conference Paper, Apr. 2018, 6 pages.
Bayar, B. et al., "Constrained Convulutional Neural Networks: A New Approach Towards General Purpose Image Manipulation Detection," IEEE Transactions on Information Forensics and Security, Apr. 11, 2018, 17 pages.
"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.
Brownlee, Jason "How Do Conventional Layers Work in Deep Learning Neural Networks?", Deep Learning for Computer Vision, Machine Learning Mastery, Making Developers Awesome at Machine Learning, Apr. 17, 2019, 22 pages.
Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.
Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.
Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.
Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.
Deacon, Peter et al., "Frequency Modulated Continuous Wave (FMCW) Radar," Design Team 6 Technical Lecture, Nov. 9, 2011, 27 pages.
Dham, Vivek "Programming Chirp Parameters in TI Radar Devices," Application Report SWRA553, Texas Instruments, May 2017, 15 pages.
Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.
Dooring Alert Systems, "Riders Matter," http:\\dooringalertsystems.com, printed Oct. 4, 2017, 16 pages.
Filippelli, Mario et al., "Respiratory dynamics during laughter," J Appl Physiol, (90), 1441-1446, Apr. 2001, http://iap.physiology.org/content/jap/90/4/1441.full.pdf.
Fox, Ben, "The Simple Technique That Could Save Cyclists' Lives," https://www.outsideonline.com/2115116/simple-technique-could-save-cyclists-lives, Sep. 19, 2016, 6 pages.
Gigie, Andrew et al., "Novel Approach for Vibration Detection Using Indented Radar", Progess in Electromagnetic Research C, vol. 87, pp. 147-162, Oct. 4, 2018.
Gouveia, Carolina et al., "A Review on Methods for Random Motion Detection and Compensation in Bio-Radar Systems", Sensors, MDPI, Jan. 31, 2019, 17 pages.
Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.
Gu, Changzhan et al., "Deep Neural Network based Body Movement Cancellation for Doppler Radar Vital Sign Detection", IEEE MTT-S International Wireless Symposium (IWS) May 19-22, 2019, 3 pages.
Gu, Changzhu "Short-Range Noncontact Sensors for Healthcare and Other Emerginng Applications: A Review", Sensors, MDPI, Jul. 26, 2016, 24 pages.
Gu, Changzhan et al., "From Tumor Targeting to Speed Monitoring", IEEE Microwave Magazine, ResearchGate, Jun. 2014, 11 pages.
Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.
Hazra, S. et al., "Robot Gesture Recognition Using Millimetric-Wave Radar System," Sensors Letter, vol. 2, No. 4, Dec. 2018, 4 pages.
Hu, Wei et al., "Noncontact Accurate Measurement of Cardiopulmonary Activity Using a Compact Quadrature Doppler Radar Sensor", IEEE Transactions on Biomedical Engineering, vol. 61, No. 3, Mar. 2014, pp. 725-735.
Immoreev, I. Ya. "Ultrawideband Radars: Features and Capabilities", Journal of Communications Technology and Electronics, ISSN: 1064-2269, vol. 54, No. 1, Feb. 8, 2009, pp. 1-26.
Inac, Ozgur et al., "A Phased Array RFIC with Built-In Self-Test Capabilities," IEEE Transactions on Microwave Theory and Techniques, vol. 60, No. 1, Jan. 2012, 10 pages.
Killedar, Abdulraheem "XWR1xxx Power Management Optimizations—Low Cost LC Filter Solution," Application Report SWRA577, Texas Instruments, Oct. 2017, 19 pages.
Kishore, N. et al., "Millimeter Wave Antenna for Intelligent Transportation Systems Application", Journal of Microwaves, Optoelectronics and Electromagnetic Applications, vol. 17, No. 1, Mar. 2018, pp. 171-178.

(56) References Cited

OTHER PUBLICATIONS

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Li, Changzhi et al., "A Review on Recent Advances in Doppler Radar Sensors for Noncontact Healthcare Monitoring", IEEE Transactions on Microwave Theory and Techniques, vol. 61, No. 5, May 2013, pp. 2046-2060.

Li, Changzhi et al., "A Review on Recent Progress of Portable Short-Range Noncontact Microwave Radar Systems", IEEE Transactions on Microwave Theory and Techniques, vol. 65, No. 5, May 2017, pp. 1692-1706.

Li, Changzhi et al., "Random Body Movement Cancellation in Doppler Radar Vital Sign Detection", IEEE Transactions on Microwave Theory and Techniques, vol. 56, No. 12, Dec. 2008, pp. 3143-3152.

Li, Changzhi et al., "Robust Overnight Monitoring of Human Vital Signs by a Non-contact Respiration and Heartbeat Detector", IEEE Proceedings of the 28th EMBS Annual International Conference, FrA05.5, Aug. 30-Sep. 3, 2006, 4 pages.

Li, Changzhi "Vital-sign monitoring on the go", Sensors news and views, www.nature.com/naturelectronics, Nature Electronics, vol. 2, Jun. 2019, 2 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Massagram, Wansuree et al., "Assessment of Heart Rate Variability and Respiratory Sinus Arrhythmia via Doppler Radar", IEEE Transactions on Microwave Theory and Techniques, vol. 57, No. 10, Oct. 2009, pp. 2542-2549.

Mercuri, Marco et al., "Vital-sign monitoring and spatial tracking of multiple people using a contactless radar-based sensor", Nature Electronics, vol. 2, Articles, https://doi.org/10.1038/s41928-019-0258-6, Jun. 2019, 13 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Mostov, K., et al., "Medical applications of shortwave FM radar: Remote monitoring of cardiac and respiratory motion", Am. Assoc. Phys. Med., 37(3), Mar. 2010, pp. 1332-1338.

Oguntala, G et al., "Indoor location identification technologies for real-time IoT-based applications: an inclusive survey", Elsevier Inc., http://hdl.handle.net/10454/16634, Oct. 2018, 42 pages.

Peng, Zhengyu et al., "A Portable FMCW Interferometry Radar with Programmable Low-IF Architecture for Localization, ISAR Imaging, and Vial Sign Tracking", IEEE Transactions on Microwave Theory and Techniques, Dec. 15, 2016, 11 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Ravanelli, Micro et al., "Interpretable Convolutional Filters with SincNet", 32nd Conference on Neural Information Processing Systems (NIPS 2018), IRASL workshop, Montreal, Canada, arXiv:1811.09725v2 [eess.AS], Aug. 9, 2019, 12 pages.

Ravanelli, Micro et al., "Speaker Recognition From Raw Waveform With Sincnet", Mila, Universite de Montreal, *CIFAR Fellow, arXiv:1808.00158v3 [eess.AS], Aug. 9, 2019, 8 pages.

Ravanelli, Micro et al., "Speech and Speaker Recognition From Raw Waveform With Sincnet", Mila, Universite de Montreal, *CIFAR Fellow, arXiv:1812.05920v2 [eess.AS], Feb. 15, 2019, 5 pages.

Richards, Mark A., "Fundamentals of Radar Signal Processing," McGraw Hill Electronic Engineering, ISBN: 0-07-144474-2, Jun. 2005, 93 pages.

Sakamoto, Takuya et al., "Feature-Based Correlation and Topological Similarity for Interbeat Interval Estimation Using Ultrawideband Radar", IEEE Transactions on Biomedical Engineering, vol. 63, No. 4, Apr. 2016, pp. 747-757.

Santra, A. et al., "Short-Range Millimetric-Wave Radar for Occupancy Sensing Application," Sensors Letters, vol. 2, No. 3, Sep. 2018, 4 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Singh, Aditya et al., "Data-Based Quadrature Imbalance Compensation for a CW Doppler Radar System", https://www.researchgate.net/publication/258793573, IEEE Transactions on Microwave Theory and Techniques, Apr. 2013, 7 pages.

Stadelmayer, Thomas et al., "2D-Convolutional Neural Network for Radar-based Human Activity Classification using raw ADC Data", Sensors Journal, vol. 16, No. 10, 11 pages. Apr. 2020.

Stephan, Michael et al., "Human Target Detection and Localization with Radars using Deep Learning", Infineon Technologies AG, International Conference of Machine Learning Applications, Dec. 2019, 13 pages.

Stephan, Michael et al., "Radar-based Human Target Detection using Deep Residual U-Net for Smart Home Applications", 18th IEEE International Conference on Machine Learning and Applications (ICMLA), Dec. 16-19, 2019, 8 pages.

Suleymanov, Suleyman, "Design and Implementation of an FMCW Radar Signal Processing Module for Automotive Applications," Master Thesis, University of Twente, Aug. 31, 2016, 61 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Tu, Jianxuan et al., "Fast Acquisition of Heart Rate in Noncontact Vital Sign Radar Measurement Using Time-Window-Variation Technique", IEEE Transactions on Instrumentation and Measurement, vol. 65, No. 1, Jan. 2016, pp. 112-122.

Vinci, Gabor et al., "Microwave Interferometer Radar-Based Vital Sign Detection for Driver Monitoring Systems", IEEE MTT-S International Conference on Microwaves for Intelligent Mobility, Apr. 27-29, 2015, 4 pages.

Vinci, Gabor et al., "Six-Port Radar Sensor for Remote Respiration Rate and Heartbeat Vital-Sign Monitoring", IEEE Transactions on Microwave Theory and Techniques, vol. 61, No. 5, May 2013, pp. 2093-2100.

Wang, Fu-Kang et al., "Wrist Pulse Rate Monitor Using Self-Injection-Locked Radar Technology", Biosensors, MDPI, Oct. 26, 2016, 12 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Will, Christoph et al., "Advanced Template Matching Algorithm for Instantaneous Heartbeat Detection using Continuous Wave Radar Systems", ResearchGate, May 2017, 5 pages.

(56) References Cited

OTHER PUBLICATIONS

Will, Christoph et al., "Human Target Detection, Tracking, and Classification Using 24-GHz FMCW Radar", IEEE Sensors Journal, vol. 19, No. 17, Sep. 1, 2019, pp. 7283-7299.
Will, Christoph et al., "Local Pulse Wave Detection using Continuous Wave Radar Systems", IEEE Journal of Electromagnetics, RF and Microwaves in Medicine and Biology, Oct. 25, 2017, 9 pages.
Will, Christoph et al., "Radar-Based Heart Sound Detection", Scientific Reports, www.nature.com/scientificreports, Jul. 26, 2018, 15 pages.
Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

\* cited by examiner

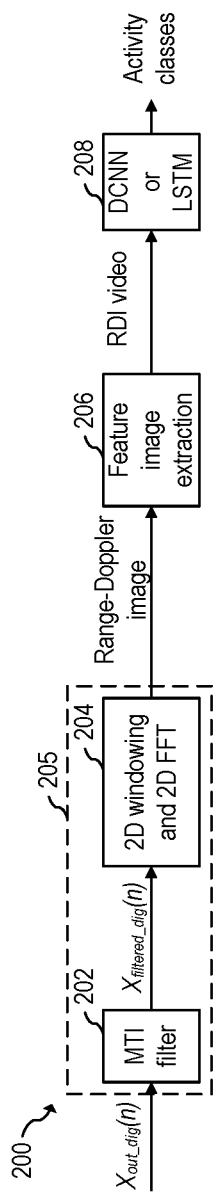
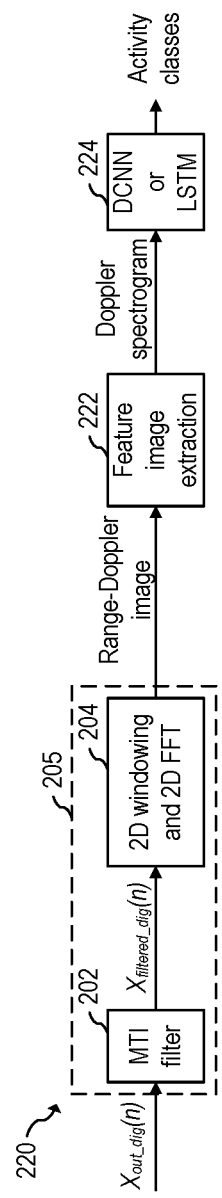
FIG. 2A
FIG. 2B

| Class | Empty room | Walking | Idle | Arm movement | Waving | Working |
|---|---|---|---|---|---|---|
| Samples per class | 579 | 695 | 834 | 694 | 687 | 686 |

1200

| Network | Accuracy (+/- deviation) | F1-score |
|---|---|---|
| Spectrogram-based NN | 90.9% (+/- 1.7%) | 91.2% |
| RDI video-based NN | 94.4% (+/- 0.7%) | 94.7% |
| DCNN with an unconstrained first 2D convolutional layer | 94.6% (+/- 2.9%) | 94.4% |
| DCNN 800 (with 2D sinc filters) | 98.9% (+/- 1.0%) | 99% |
| DCNN 900 (with 2D Morlet wavelet filters) | 99.5% (+/- 0.1%) | 99.5% |

FIG. 15

| | Empty room | Walking | Idle | Arm movement | Waving | Working |
|---|---|---|---|---|---|---|
| Empty room | 1 | 0 | 0 | 0 | 0 | 0 |
| Walking | 0 | 1 | 0 | 0 | 0 | 0 |
| Idle | 0.001 | 0 | 0.95 | 0 | 0 | 0 |
| Arm movement | 0 | 0.005 | 0 | 0.99 | 0 | 0.051 |
| Waving | 0 | 0 | 0.016 | 0 | 0.97 | 0.003 |
| Working | 0 | 0.003 | 0.25 | 0 | 0 | 0.75 |

Classification using RDI video-based NN

FIG. 16

| | Empty room | Walking | Idle | Arm movement | Waving | Working |
|---|---|---|---|---|---|---|
| Empty room | 1 | 0 | 0 | 0 | 0 | 0 |
| Walking | 0 | 1 | 0 | 0 | 0 | 0 |
| Idle | 0 | 0 | 1 | 0 | 0 | 0 |
| Arm movement | 0 | 0 | 0 | 1 | 0 | 0 |
| Waving | 0 | 0 | 0.006 | 0.002 | 0.99 | 0 |
| Working | 0 | 0 | 0.003 | 0.014 | 0 | 0.98 |

Classification using DCNN 900

1700
| Layer | DCNN 800 | DCNN 900 | Unconstrained DCNN |
|---|---|---|---|
| First layer | 256<br>(layer 802)<br>(64, 65x33) | 256<br>(layer 902)<br>(64, 129x33) | 137,344<br>(unconstrained conv2D)<br>(64, 65x33) |
| Layer 808 (unconstrained conv2D)<br>(50, 3x3) | 28,850 | 28,850 | 28,850 |
| Layer 812 (dense)<br>(32) | 102,432 | 102,432 | 102,432 |
| Layer 814 (softmax)<br>(6) | 198 | 198 | 198 |
| Total | 131,736 | 131,736 | 268,824 |
FIG. 17
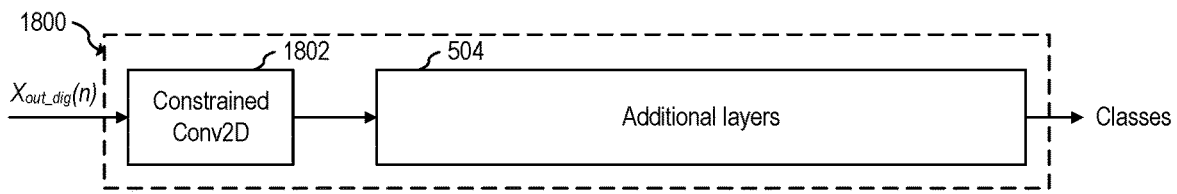
FIG. 18
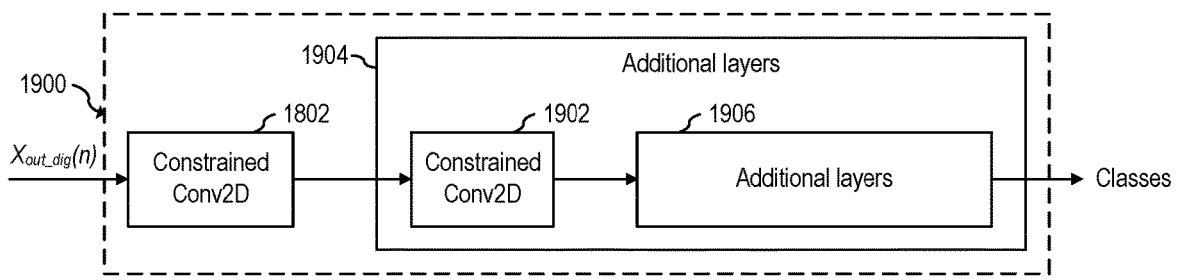
FIG. 19

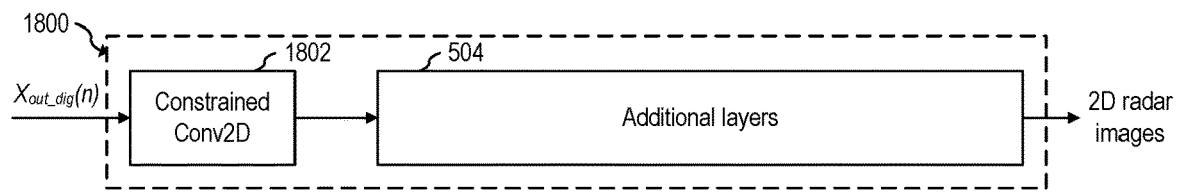
FIG. 21
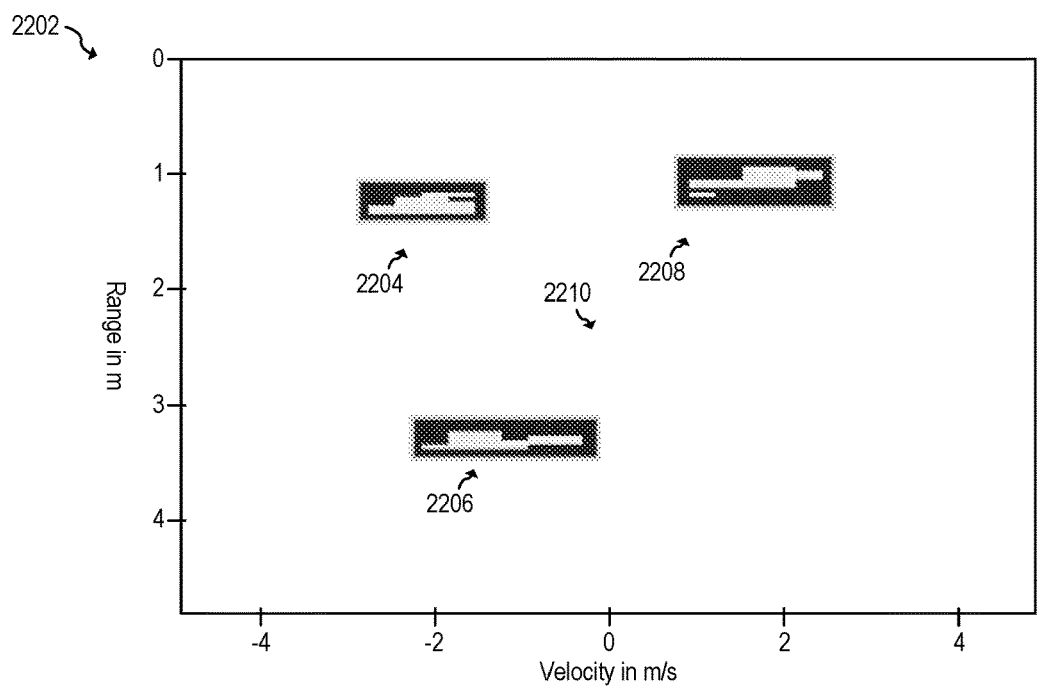
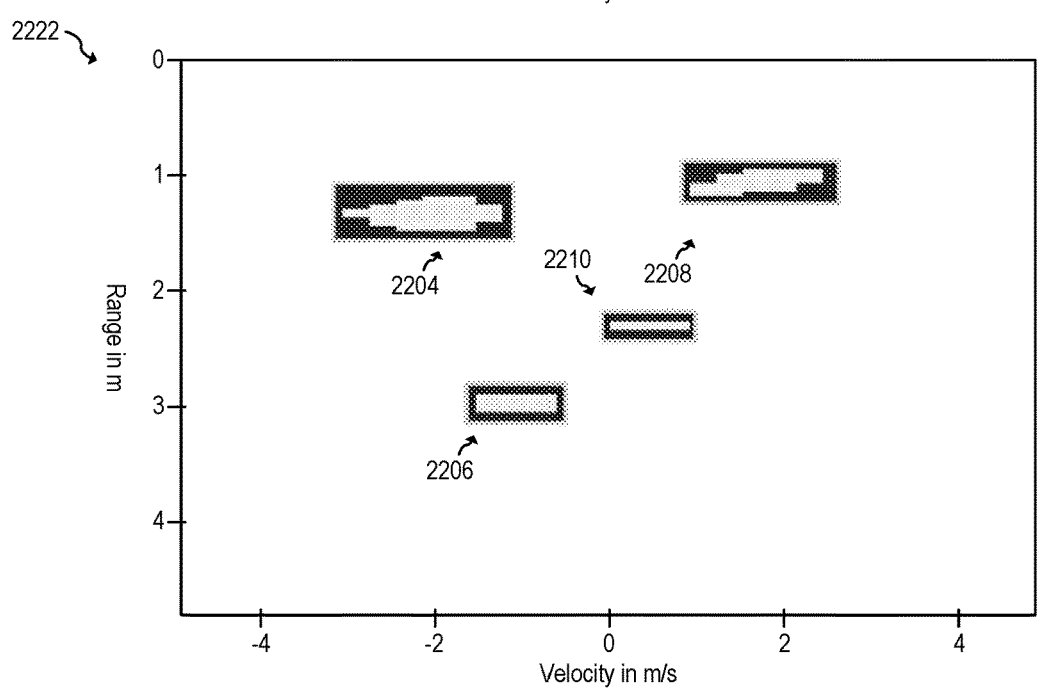
FIG. 22

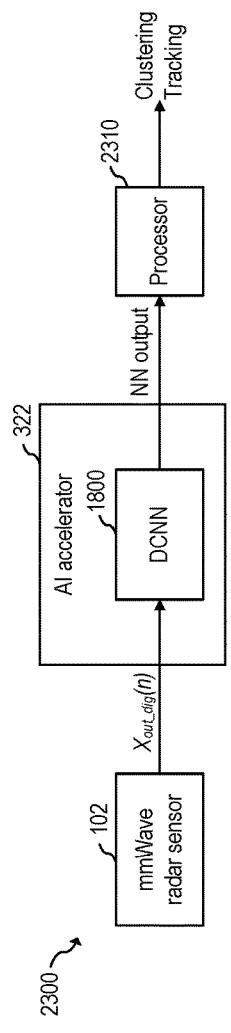
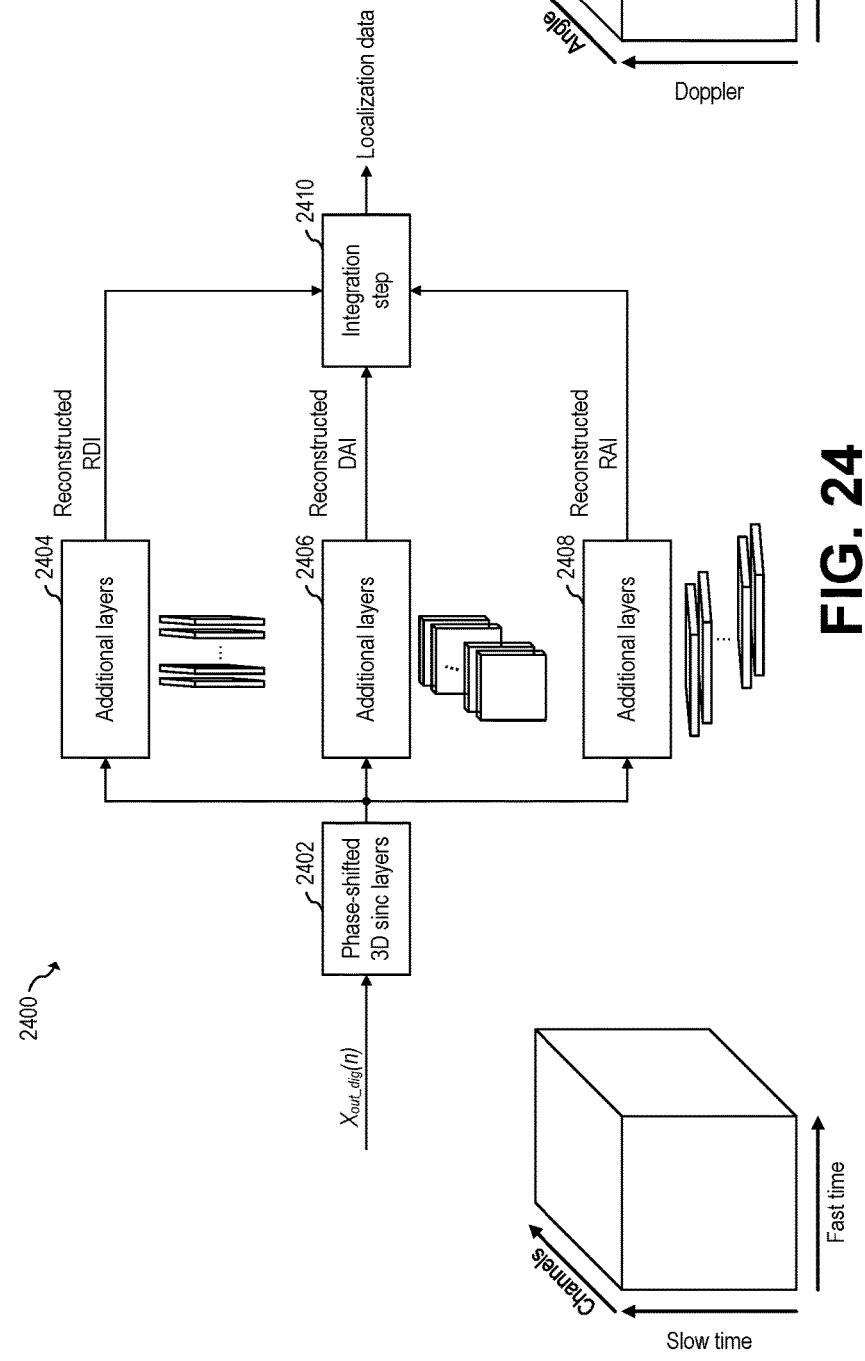
FIG. 23
FIG. 24

PARAMETRIC CNN FOR RADAR PROCESSING

This application is a continuation of U.S. patent application Ser. No. 16/905,335, filed on Jun. 18, 2020, which application is hereby incorporated herein by reference.

TECHNICAL FIELD

The present disclosure relates generally to an electronic system and method, and, in particular embodiments, to a parametric convolutional neural network (CNN) for radar processing.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuits used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

SUMMARY

In accordance with an embodiment, a method includes: transmitting a plurality of radar signals using a millimeter-wave radar sensor towards a target; receiving a plurality of reflected radar signals that correspond to the plurality of transmitted radar signals using the millimeter-wave radar; mixing a replica of the plurality of transmitted radar signals with the plurality of received reflected radar signals to generate an intermediate frequency signal; generating raw digital data based on the intermediate frequency signal using an analog-to-digital converter; processing the raw digital data using a constrained L dimensional convolutional layer of a neural network to generate intermediate digital data, where L is a positive integer greater than or equal to 2, and where the neural network includes a plurality of additional layers; and processing the intermediate digital data using the plurality of additional layers to generate information about the target.

In accordance with an embodiment, a radar system includes: a millimeter-wave radar sensor including: a transmitting antenna configured to transmit a plurality of radar signals towards a target; a receiving antenna configured to receive a plurality of reflected radar signals; a mixer configured to mix a replica of the plurality of transmitted radar signals with the plurality of received reflected radar signals to generate an intermediate frequency signal; an analog-to-digital converter (ADC) configured to generate, at an output of the ADC, raw digital data based on the intermediate frequency signal; and an artificial intelligence (AI) accelerator having an input coupled to the output of the ADC, and configured to: receive the raw digital data from the ADC, and process the raw digital data using a constrained L dimensional convolutional layer of a neural network to generate intermediate digital data, where L is a positive integer greater than or equal to 2, and where the neural network includes a plurality of additional layers; and process the intermediate digital data using the plurality of additional layers to generate, at an output of the AI accelerator, data associated with the target.

In accordance with an embodiment, a radar system includes: a millimeter-wave radar configured to transmit a plurality of chirps towards a target, and to receive a plurality of reflected chirps; a mixer configured to mix a replica of the plurality of transmitted chirps with the plurality of received reflected chirps to generate an intermediate frequency signal; an analog-to-digital converter (ADC) configured to generate, at an output of the ADC, raw digital data based on the intermediate frequency signal; and a processor having an input coupled to the output of the ADC, and configured to: receive the raw digital data from the ADC, and process the raw digital data using a neural network having a first constrained two dimensional convolutional layer followed by a plurality of additional layers to generate, at an output of the plurality of additional layers, data associated with the target.

BRIEF DESCRIPTION OF THE DRAWINGS

For a more complete understanding of the present invention, and the advantages thereof, reference is now made to the following descriptions taken in conjunction with the accompanying drawings, in which:

FIG. 2A shows a flow chart of a method for pre-processing and processing the raw digital data generated by the millimeter-wave radar sensor of FIG. 1;

FIG. 2B shows a flow chart of an another method for pre-processing and processing the raw digital data generated by the millimeter-wave radar sensor of FIG. 1;

FIGS. 11-17 show experimental setup or results of DCNN of FIGS. 8 and 9, as implemented using the radar system of FIG. 3, according to embodiments of the present invention;

FIG. 18 shows a block diagram of a DCNN for target and/or activity classification, according to an embodiment of the present invention;

FIG. 19 shows a block diagram of a DCNN for target and/or activity classification, according to an embodiment of the present invention;

FIG. 21 shows a block diagram of the DCNN of FIG. 18 for generating 2D radar images, according to an embodiment of the present invention;

FIG. 22 shows exemplary 2D radar images during training of the DCNN of FIG. 18, according to an embodiment of the present invention;

FIG. 23 shows a schematic diagram of a radar system, according to an embodiment of the present invention; and FIG. 24 shows a block diagram of a DCNN for generating target localization data, according to an embodiment of the present invention.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
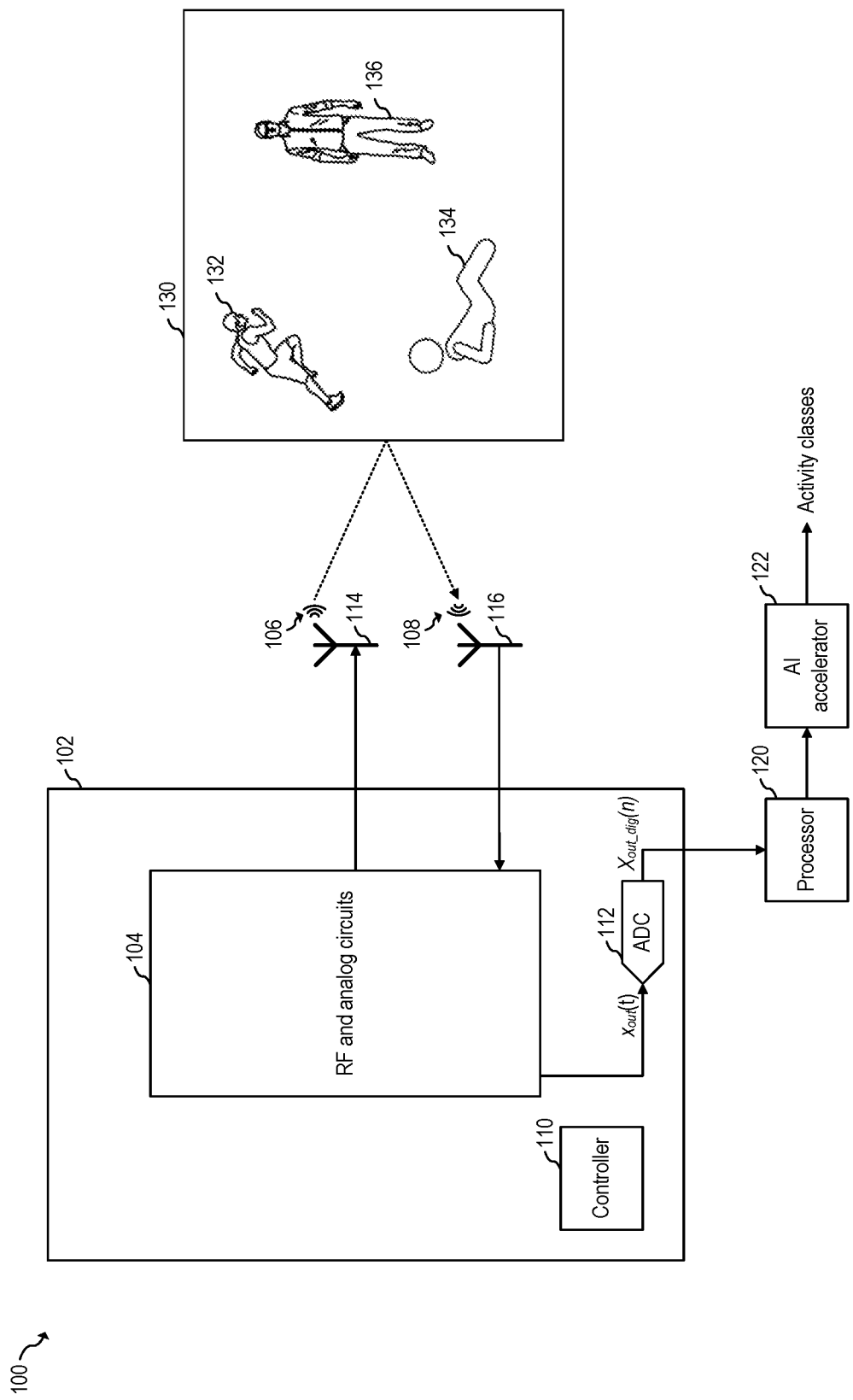
FIG. 1 shows a schematic diagram of an exemplary radar system.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a deep CNN (DCNN) for millimeter-wave (mmWave) radar-based (human) target classification or radar-based (human) target localization that uses a parametric two-dimensional (2D) or 3D CNN layer for receiving raw digital data from an analog-to-digital converter (ADC) of the millimeter-wave radar. In some embodiments, the DCNN uses an L-dimensional CNN layer for receiving the raw digital data, where L is a positive integer greater than or equal to 2. Some embodiments may generate other information about the target in addition, or instead of target classification and/or target localization. Some embodiments may be implemented in radars operating in regimes different than millimeter-wave and/or for targets other than human targets, such as animals or autonomous machines, for example.

In an embodiment of the present invention, a DCNN receives raw digital data from an ADC of a millimeter-wave radar, and processes the raw digital data to extract features for classification (e.g., of human activities) directly from the raw digital data without using conventional preprocessing methods (such as background mean subtraction, range discrete Fourier transform, and/or Doppler fast Fourier transform). In some embodiments, the initial (first) layer of the DCNN (which receives the raw digital data from the ADC) is implemented as a constrained 2D convolutional layer. In some embodiments, the constrained 2D convolutional layer uses 2D sinc filter kernels. In other embodiments, the constrained 2D convolutional layer uses 2D Morlet wavelet filter kernels. Other filter kernels, such as filter kernels based on Fractional Fourier Transform, and Discrete Cosine Transform, may also be used.

People sensing and activity classification have increasing application potential in various areas, such as physical security, defense, and surveillance. In industrial and consumer space, for example, human activity recognition finds applications in smart homes, human-machine interfaces and elderly fall-motion monitoring systems. For example, knowledge of the performed activity in a room can enable smart control of the energy consumption, such as HVAC and lighting. Furthermore, knowledge of the performed human activity facilitates ubiquitous smart home solution by, e.g., discerning the user's intent.

Human activity recognition also enables sensing and recognition of elderly fall-motion. Elderly falls are a leading cause of death in elderly population. In some cases, an elderly fall may lead to major restrictions to the overall mobility of the individual if medical assistance is not provided immediately.

Some conventional human activity recognition systems are based on cameras and computer vision approaches. These systems are generally accurate and relatively easy to implement. However, camera systems may suffer from lack of privacy and may be sensitive to illumination conditions, which may render some camera systems unsuitable for some applications.

Radars may also be used to effectively sense human activities. Radars may offer privacy preserving and illumination-invariance properties, and are capable of being aesthetically concealed in the operating environment.

FIG. 1 shows a schematic diagram of exemplary radar system 100. Radar system 100 includes millimeter-wave radar sensor 102, processor 120, and artificial intelligence (AI) accelerator 122.

During normal operation, millimeter-wave radar sensor 102 operates as a frequency-modulated continuous-wave (FMCW) radar sensor and transmits a plurality of radar signals 106, such as chirps, towards scene 130 using transmitter (TX) antenna 114. The radar signals 106 are generated using RF and analog circuits 104. The radar signals 106 may be in the 20 GHz to 122 GHz range.

The objects in scene 130 may include idle humans, such as lying human 134 and standing human 136, and moving humans, such as walking human 132. The objects in scene 108 may also include static objects (not shown), such as furniture, walls, and periodic movement equipment, such as fans. Other objects may also be present in scene 120.

The transmitted radar signals 106 are reflected by objects in scene 120. The reflected radar signals 108, which are also referred to as the echo signal, are received by receiver (RX) antenna 116. RF and analog circuits 104 processes the received reflected radar signals 108 using, e.g., band-pass filters (BPFs), low-pass filters (LPFs), mixers, low-noise amplifier (LNA), and/or intermediate frequency (IF) amplifiers in ways known in the art to generate an analog signal $x_{out}(t)$.

The analog signal $x_{out}(t)$ is converted to raw digital data $x_{out\_dig}(n)$ using ADC 112. The raw digital data $x_{out\_dig}(n)$ is pre-processed by processor 120 and then processed by AI accelerator 122 to classify the activity of a human in scene 130.

Controller 110 controls one or more circuits of millimeter-wave radar sensor 102, such as RF and analog circuit 104 and/or ADC 112.

Processor 104 may be implemented in any way known in the art, such as a general purpose processor, controller or digital signal processor (DSP) that includes, for example, combinatorial circuits coupled to a memory.

AI accelerator 122 is designed to accelerate artificial intelligence applications, such as artificial neural networks and machine learning. AI accelerator 122 may be implemented in any way known in the art.

FIG. 2A shows a flow chart of method 200 for pre-processing and processing the raw digital data $x_{out\_dig}(n)$. Method 200 includes a preprocessing step 205, which includes steps 202 and 204, a feature extraction step 206, and a classification step 208. Steps 202, 204, and 206 are performed by processor 120. Step 208 is performed by AI accelerator 122.

During step 202, a 1D moving target indication (MTI) filter is applied to the raw digital data $x_{out\_dig}(n)$ to remove the response from static targets (such as, e.g., chairs, tables and walls) and also of the transmitter-receiver leakage, which affects the first few range bins. The MTI filter may be performed by subtracting the mean along the fast-time (intra-chirp time) to remove the transmitter-receiver leakage that perturbs the first few range bins, followed by subtracting the mean along the slow-time (inter-chirp time) to remove the reflections from static objects (or zero-Doppler targets).

During step 204, 2D windowing is applied to the filtered digital data $x_{filtered\_dig}(n)$ along the fast-time as well slow-time dimensions, followed by a 2D fast Fourier transform (FFT) to generate a 2D matrix representing the received energy spectrum over range and velocity, also known as range-Doppler image (RDI).

During method 206, feature image extraction is performed on the range-Doppler image to generate an RDI video. The RDI video can be expressed as $$v_{RDI}(p, l, k) = \left| \sum_{m=1}^{U_{st}} \sum_{n=1}^{U_{ft}} w(m, n) s(m, n, k) e^{-j2\pi\left(\frac{m \cdot p}{U_{st}} + \frac{n \cdot l}{U_{ft}}\right)} \right| \quad (1)$$

where $U_{st}$ is the FFT size along slow-time, $U_{ft}$ is the FFT size along fast-time, w(m,n) is the 2D weighting function along the fast-time and slow-time, s(m,n,k) is the ADC data ($x_{out\_dig}$) on the kth frame, where the indexes n and m sweep along the fast-time and slow-time axes, respectively. The l and p indexes sweep along the range and Doppler axes, respectively.

During step 208, the RDI video is fed to a DCNN or LSTM, which classifies the human activity of the detected human target based on the RDI video as well as on the training of the DCNN or LSTM.

FIG. 2B shows a flow chart of method 220 for pre-processing and processing the raw digital data $x_{out\_dig}(n)$. Method 220 includes a preprocessing step 205, which includes steps 202 and 204, a feature extraction step 222, and a classification step 224. Steps 202, 204, and 222 are performed by processor 120. Step 224 is performed by AI accelerator 122. Steps 202 and 204 of method 220 are performed in a similar manner as in method 200.

During step 222, feature image extraction is performed on the range-Doppler image by marginalizing over range to generate a Doppler spectrum. Each generated Doppler spectrum includes information about the macro-Doppler component as well as the micro-Doppler component due to hand and leg movements of the detected human target while performing an activity.

The Doppler spectrum from consecutive frames is stacked one after another to generate a 2D image. The stacked Doppler spectrum across consecutive frames is referred to as Doppler spectrogram, and includes information about the instantaneous Doppler spectral content and the variation of the Doppler spectral content over time.

The Doppler spectra of the slow-time data from the kth radar frame on the selected L range bins can be expressed $$S(p,k) = \sum_{l=1}^{L} v_{RDI}(p,l,k) \quad (2)$$

where $V_{RDI}$ may be given by Equation 1.

During step 224, the Doppler spectrogram is fed to a DCNN or long short-term memory (LSTM) neural network, which classifies the human activity of the detected human target based on the spectrogram as well as on the training of the DCNN or LSTM.

In an embodiment of the present invention, the preprocessing step (e.g., 205) and the feature extraction step (e.g., steps 206 or 222) are omitted. Instead, a neural network is used to generate, e.g., human activity classification, directly from the raw digital data from the ADC. By directly operating on the raw digital data from the ADC using a DCNN, some embodiments advantageously reduce computational complexity as well as eliminating the need for a DSP for preprocessing.

Figure 3:
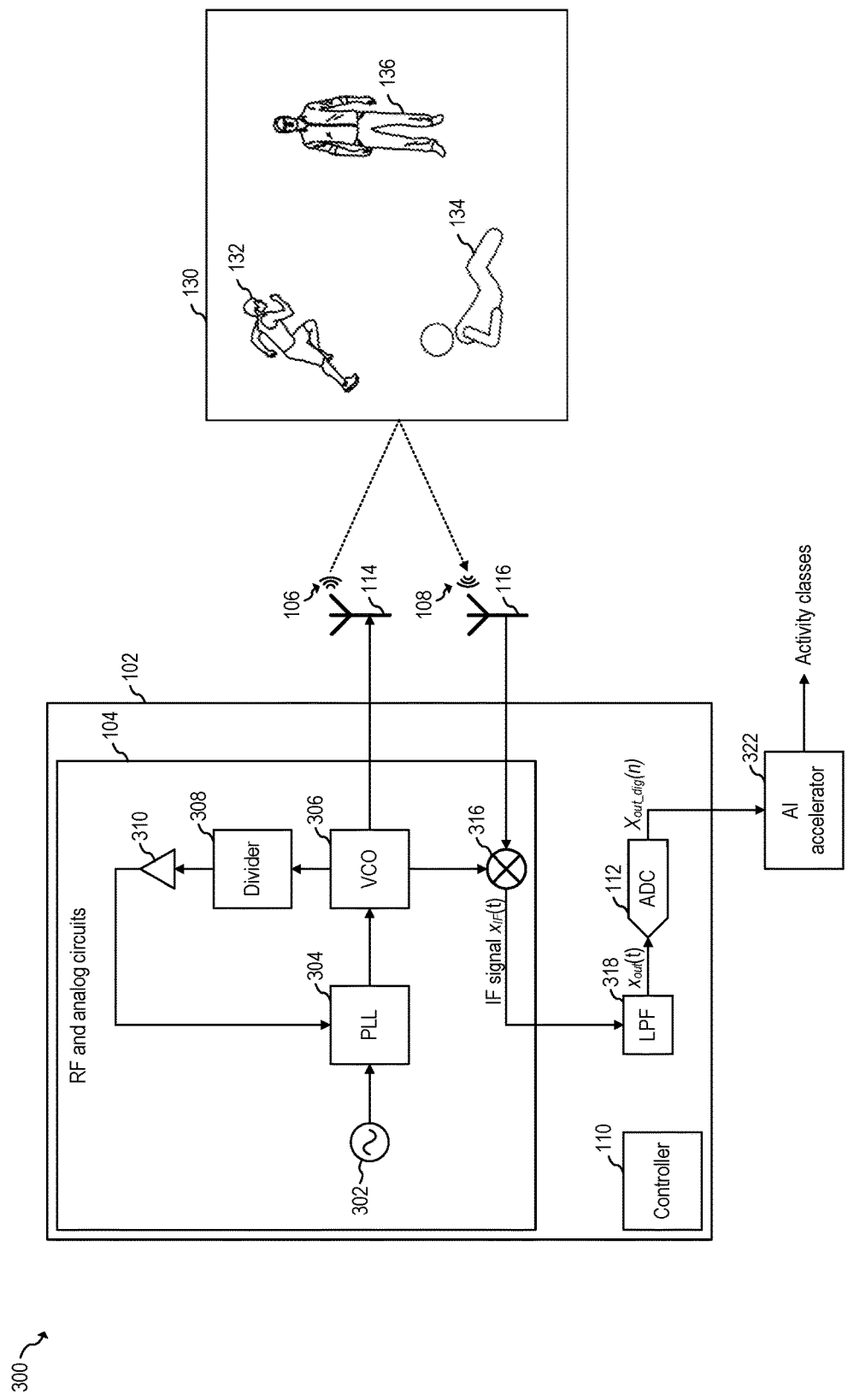
FIG. 3 shows a schematic diagram of a radar system, according to an embodiment of the present invention.

FIG. 3 shows a schematic diagram of radar system 300, according to an embodiment of the present invention. Radar system 300 includes millimeter-wave radar sensor 102, and artificial intelligence (AI) accelerator 322.

As shown, FIG. 3 illustrates a possible implementation of millimeter-wave radar sensor 102, according to an embodiment of the present invention. Other implementations are also possible.

As shown in FIG. 3, in some embodiments, millimeter-wave radar sensor 102 includes reference oscillator 302, phased-locked-loop (PLL) 304, voltage controlled oscillator (VCO) 306, frequency divider 308, amplifier 310, mixer 316, low-pass filter (LPF) 318, and ADC 112.

During normal operation, VCO 306 generates a linear frequency chirp (e.g., from 57 GHz to 64 GHz), which is transmitted by transmitting antenna 114. The VCO is controlled by PLL 304, which receives a reference clock signal (e.g., 80 MHz) from reference oscillator 302. PLL 304 is controlled by a loop that includes frequency divider 308 and amplifier 310.

The linear chirp transmitted by transmitting antenna 114 is reflected by objects in scene 130 and received by receiving antenna 116. The echo received by transmitting antenna 116 is mixed with a replica of the signal transmitted by transmitting antenna 114 using mixer 316 to reduce an intermediate frequency (IF) signal $x_{IF}(t)$ (also known as the beat signal). In some embodiments, the beat signal $x_{IF}(t)$ has a bandwidth between 10 kHz and 1 MHz. A beat signal $x_{IF}(t)$ with a bandwidth lower than 10 kHz or higher than 1 MHz is also possible.

The beat signal $x_{IF}(t)$ is filtered with low-pass filter (LPF) 318 and then sampled by ADC 112. ADC 112 is advantageously capable of sampling the filtered beat signal $x_{out}(t)$ with a sampling frequency that is much smaller than the frequency of the signal received by receiving antenna 116. Using FMCW radars, therefore, advantageously allows for a compact and low cost implementation of ADC 112, in some embodiments.

The raw digital data $x_{out\_dig}(n)$, which in some embodiments is the digitized version of the filtered beat signal $x_{out}(t)$, is (e.g., temporarily) stored (e.g., in matrices of $N_c \times N_s$, where $N_c$ is the number of chirps considered in a frame and $N_s$ is the number of transmit samples per chirp) for further processing.

In some embodiments, ADC 112 is a 12-bit ADC. ADCs with higher resolution, such as 14-bits or higher, or with lower resolution, such as 10-bits, or lower, may also be used.

As shown in FIG. 3, in some embodiments, AI accelerator 322 is used to process the raw digital data $x_{out\_dig}(n)$ from ADC 112 to classify the activity of a target in scene 130. AI accelerator 322 may be implemented in any way known in the art.

Although, as shown in FIG. 3, some embodiments use AI accelerator 322 to implement the neural network to process the raw digital data $x_{out\_dig}(n)$ to classify the activity of a target in scene 130, other hardware implementations, different from an AI accelerator, or in addition to an AI accelerator may also be used. For example, some embodiments may implement the neural network used for classifying the target (e.g., such as DCNN 500, 800 or 900, as described in more detailed below) using a general purpose processor, controller or digital signal processor (DSP) that includes, for example, combinatorial circuits coupled to a memory. In some embodiments, the neural network may be implemented with an ARM or x86 architecture, for example. In some embodiments, the neural network may be implemented using a custom application specific integrated circuit (ASIC) and/or using a combination of hardware accelerator and software running on a DSP or general purpose microcontroller. Other implementations are also possible.

Figure 4:
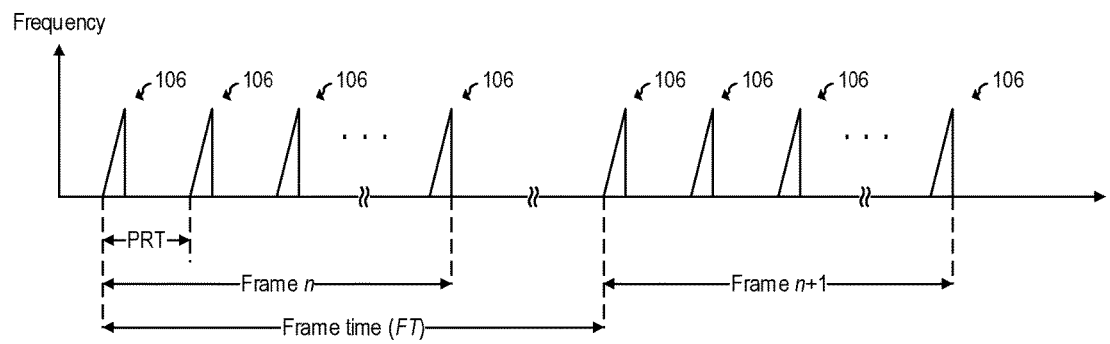
FIG. 4 shows a sequence of chirps transmitted by the TX antenna of FIG. 3, according to an embodiment of the present invention.

FIG. 4 shows a sequence of chirps 106 transmitted by TX antenna 114, according to an embodiment of the present invention. As shown by FIG. 4, chirps 106 are organized in a plurality of frames and may be implemented as up-chirps. Some embodiments may use down-chirps or a combination of up-chirps and down-chirps.

The time between chirps of a frame is generally referred to as pulse repetition time (PRT). In some embodiments, the PRT is 5 ms. A different PRT may also be used, such as less than 5 ms, such as 4 ms, 2 ms, or less, or more than 5 ms, such as 6 ms, or more.

Frames of chirps 106 may include a plurality of chirps. For example, in some embodiments, each frame of chirps includes 16 chirps. Some embodiments may include more than 16 chirps per frame, such as 20 chirps, 32 chirps, or more, or less than 16 chirps per frame, such as 10 chirps, 8 chirps, or less. In some embodiments, each frame of chirps includes only a single chirp.

Frames are repeated every FT time. In some embodiments, FT time is 50 ms. A different FT time may also be used, such as more than 50 ms, such as 60 ms, 100 ms, 200 ms, or more, or less than 50 ms, such as 45 ms, 40 ms, or less.

In some embodiments, the FT time is selected such that the time between the beginning of the last chirp of frame n and the beginning of the first chirp of frame n+1 is equal to PRT. Other embodiments may use or result in a different timing.

Some activities can be distinguished by analyzing their unique range-velocity profiles (e.g., as shown in FIGS. 2A and 2B). Some activities may have very different range-velocity profiles, such as walking and standing idle. However, some activities may exhibit only slight differences in their range-velocity profiles. For example, working on a laptop and sitting idle on a chair may only differ by the slight movement of the hands exhibited by the human working on the laptop. Thus, a higher resolution on specific frequency bands may be required in order to accurately distinguish these actions. However, when using preprocessing steps, such as steps 205, 206 and 222, the whole observable range-velocity space is discretized in equal bins.

In an embodiment of the present invention, a first 2D convolutional layer of a neural network uses a plurality of time-domain band-pass filters (e.g., using 2D sinc filter kernels) that are trained so that their respective cutoff frequencies are adjusted according to the needs of a particular application. Thus, in some embodiments, replacing the preprocessing steps (e.g., such as steps 205, 206 and 222) by a DCNN that uses a first 2D convolutional layer that is constrained to optimize cutoff frequencies of a plurality of time-domain band-pass filters advantageously results in improved accuracy during activity recognition when compared with implementations using explicit preprocessing steps, such as steps 205, 206 and 222. By constraining the first 2D convolutional layer to a predefined shape (such as using 2D sinc filter kernels or other types of predefined kernels), some embodiments advantageously achieve faster training convergence times and help mitigate or avoid the problem of getting stuck in local minima.

Figure 5:
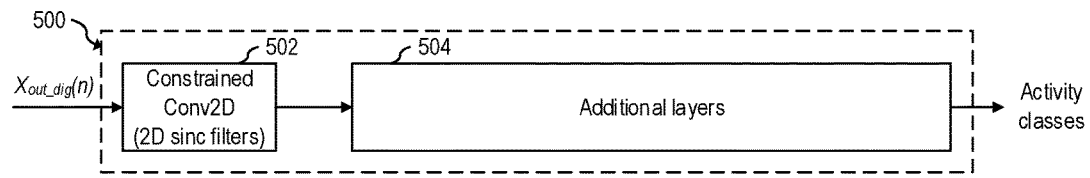
FIG. 5 shows a block diagram of a deep CNN (DCNN) for activity classification, according to an embodiment of the present invention.

FIG. 5 shows a block diagram of DCNN 500 for activity classification, according to an embodiment of the present invention. DCNN 500 includes constrained 2D convolutional layer 502 and a plurality of additional layers 504. Additional layers 504 may include, for example, one or more convolutional layers (including complex and non-complex convolutional layers), fully-connected layers, recurrent layers, pooling layers, and/or dense layers. In some embodiments, additional layers 504 may be implemented using known neural network architectures, such as U-Net or atrous convolutional layers. DCNN 500 may be implemented, e.g., in AI accelerator 322.

As shown in FIG. 5, 2D convolutional layer 502 is implemented with a plurality of 2D sinc filters that are constrained such that only cutoff frequencies and/or bandwidth of each 2D sinc filter are trainable (as opposed to an unconstrained 2D convolutional layer, in which all parameters of each filter are trainable, where each filter is not constrained to be of a specific type, such as of the 2D sinc filter type). For example, in some embodiments, each 2D sinc filter of 2D convolutional layer 502 may be given by $$sinc_{2D}(n, m; f_l^{st}, b_{st}, f_l^{ft}, b_{ft}) = \qquad (3)$$

$$w(n, m) h_{N,f_s^{st}}(n; f_l^{st}, b_{st}) h_{M,f_s^{ft}}(m; f_l^{ft}, b_{ft})$$

where $$h_{N,f_s^{st}}(n; f_l^{st}, b_{st})$$

is a slow-time 1D sinc filter, N is a length of the slow-time 1D sinc filter, $f_1^{st}$ is a lower cutoff frequency of the slow-time 1D sinc filter, $b_{st}$ is a bandwidth of the slow-time 1D sinc filter, n is a slow-time filter parameter index (n is an integer between 0 and N, inclusive), $$h_{M,f_s^{ft}}(m; f_l^{ft}, b_{ft})$$

is a fast-time 1D sinc filter, M is a length of the fast-time 1D sinc filter, $f_1^{ft}$ is a lower cutoff frequency of the fast-time 1D sinc filter, $b_{ft}$ is a bandwidth of the fast-time 1D sinc filter, m is a fast-time filter parameter index (m is an integer between 0 and M, inclusive), and w(n,m) is a 2D cosine weighting function. The 2D cosine weighting function may be given by $$w(n, m) = \frac{1}{4}\left(1 + \cos\left(2\pi \frac{n - \left\lfloor \frac{N}{2} \right\rfloor}{N}\right)\right) * \left(1 + \cos\left(2\pi \frac{m - \left\lfloor \frac{M}{2} \right\rfloor}{M}\right)\right) \qquad (4)$$

and the slow-time 1D sinc filter and the fast-time 1D sinc filter may be given by (5)

$$h_{K,f_s}(k, f_l, b) =$$

$$2(f_l + b)sinc\left(2(f_l + b) \cdot \frac{k - \left\lfloor \frac{K}{2} \right\rfloor}{f_s}\right) - 2f_l \cdot sinc\left(2f_l \cdot \frac{k - \left\lfloor \frac{K}{2} \right\rfloor}{f_s}\right)$$

where K is the length of a 1D sinc filter, k is an integer between 0 and K, inclusive, $f_s$ is a sampling frequency of the data to be filtered (e.g., $x_{out\_dig}(n)$), $f_l$ is a lower cutoff frequency, b is a bandwidth of the 1D sinc filter, and k is a filter parameter index, where $$sinc(x) = \frac{\sin(\pi x)}{\pi x}.$$

In the 2D sinc filters $sinc_{2D}$ of 2D convolutional layer 502, as defined by Equation 3, the trainable parameters (also referred to as the hyperparameters), are the lower cutoff frequencies ($f_1^{st}$ and $f_1^{ft}$) and the bandwidths ($b_{st}$ and $b_{ft}$) of the slow-time and fast-time 1D sinc filters, respectively. It is understood that, e.g., the bandwidths ($b_{st}$ and $b_{ft}$) or lower cutoff frequencies hyperparameters may be replaced by, e.g., the higher cutoff frequencies of the slow-time and fast-time 1D sinc filters, respectively, or by a center frequency, without affecting performance.

During training of DCNN 500, the constrained 2D convolutional layer 502 is initialized according to the definition 2D sinc filters and only the hyperparameters are allowed to be learned. As a result, the trained filters of the constrained 2D convolutional layer 502 are 2D bandpass filters (e.g., with rectangular shape in the frequency domain) that have their respective cutoff frequencies optimized based on the training data.

Figure 6:
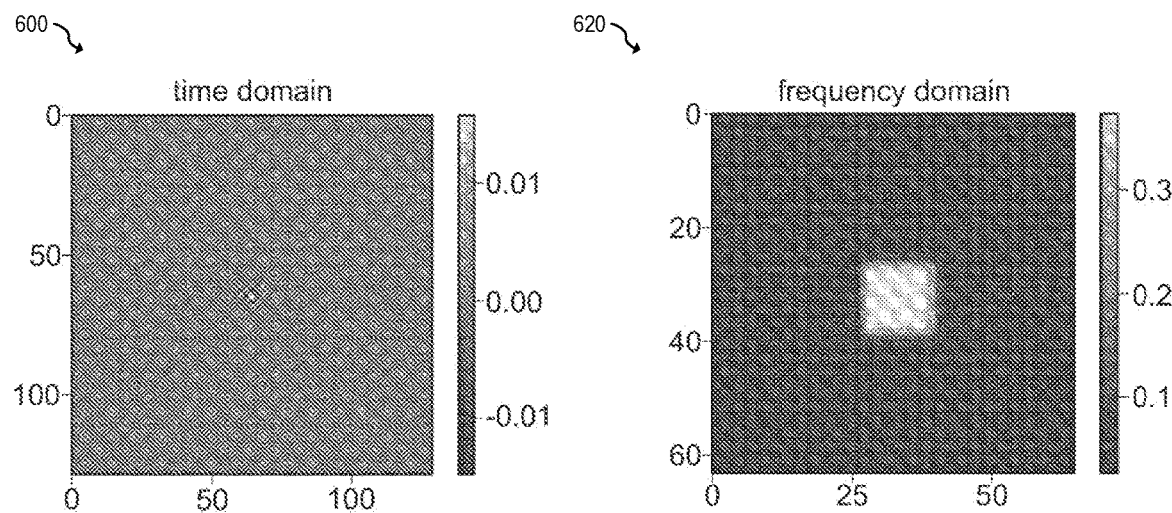
FIG. 6 shows an exemplary two-dimensional (2D) sinc filter, as used in the constrained convolutional layer of FIG. 5, in time and frequency domain, according to an embodiment of the present invention.

FIG. 6 shows an exemplary 2D sinc filter $sinc_{2D}$, as used in constrained 2D convolutional layer 502, in time and frequency domains, according to an embodiment of the present invention. As shown in FIG. 6, the 2D sinc filter $sinc_{2D}$ is a 2D band-pass filter that exhibits clear cutoff frequencies in the frequency domain, as illustrated by the rectangular shape in plot 620. As shown in FIG. 6, the 2D sinc filter $sinc_{2D}$ is capable of extracting joint range and velocity features of data to be filtered (e.g., $x_{out\_dig}(n)$).

In some embodiments, the 2D sinc filters used in constrained 2D convolutional layer 502 include a rotational parameter for rotating the 2D sinc filters with respect to the pseudo range domain and pseudo Doppler domain. In such embodiments, each 2D sinc filter of 2D convolutional layer 502 may be given by $$\phi_{sinc}(n, m; f_l^{st}, b_{st}, f_l^{ft}, b_{ft}) = 4w(n, m) \qquad (6)$$

$$((f_l^{st} + b_{st})(f_l^{ft} + b_{ft})sinc(2(f_l^{st} + b_{st})t'_{st}, 2(f_l^{ft} + b_{ft})t'_{ft})$$

$$-(f_l^{st} + b_{st})f_l^{ft}sinc(2(f_l^{st} + b_{st})t'_{st}, 2f_l^{ft}t'_{ft})$$

$$-f_l^{st}(f_l^{ft} + b_{ft})sinc(2f_l^{st}t'_{st}, 2(f_l^{ft} + b_{ft})t'_{ft}) + f_l^{st}f_l^{ft}sinc(2f_l^{st}t'_{st}, 2t'_{ft})) \text{ where}$$

$$sinc(x, y) = \frac{\sin(\pi x)\sin(\pi y)}{\pi^2 xy} \qquad (7)$$

$$t'_{st} = \frac{n - \left\lfloor \frac{N}{2} \right\rfloor}{f_0^{st}}\cos(\alpha) - \frac{m - \left\lfloor \frac{M}{2} \right\rfloor}{f_0^{st}}\sin(\alpha) \qquad (8)$$

$$t'_{ft} = \frac{n - \left\lfloor \frac{N}{2} \right\rfloor}{f_0^{st}}\sin(\alpha) + \frac{m - \left\lfloor \frac{M}{2} \right\rfloor}{f_0^{ft}}\cos(\alpha) \qquad (9)$$

where $\alpha$ is a rotation angle, N is a length of the 2D sinc filter in slow-time, $f_1^{st}$ is a lower cutoff frequency of the 2D sinc filter in slow-time, $b_{st}$ is a bandwidth of the 2D sinc filter in slow-time, n is a slow-time filter parameter index (n is an integer between 0 and N, inclusive), M is a length of the 2D sinc filter in fast-time, $f_1^{ft}$ is a lower cutoff frequency of the 2D sinc filter in fast-time, $b_{ft}$ is a bandwidth of the 2D sinc filter in fast-time, m is a fast-time filter parameter index (m is an integer between 0 and M, inclusive), and w(n,m) is a 2D cosine weighting function (e.g., as given in Equation 4).

Figure 7:
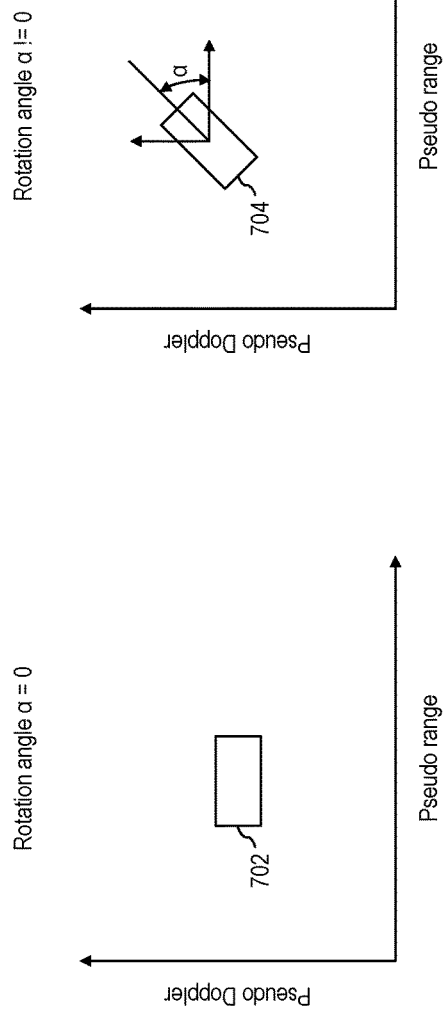
FIG. 7 illustrate the impact of the angle of rotation α with respect to the pseudo range domain and pseudo Doppler domain, according to an embodiment of the present invention.

When the rotation angle $\alpha$ is equal to 0, Equation 6 can be expressed as Equation 3. FIG. 7 illustrate the impact of the angle of rotation $\alpha$ with respect to the pseudo range domain and pseudo Doppler domain, according to an embodiment of the present invention. Pseudo range and Doppler domain are used here for representation of the feature maps that are obtained after applying, e.g., 2D sinc, convolutions.

As shown in FIG. 7, an exemplary 2D sinc filter 704 is rotated with respect to the pseudo range and pseudo Doppler domains by rotation angle $\alpha$. An exemplary 2D sinc filter 702 having the rotation angle $\alpha$ equal to 0, can be expressed using Equation 4.

In some embodiments, DCNN 500 is implemented with a categorical cross-entropy as a loss function. Other loss functions, such as mean square error may also be used.

In some embodiments, convolutional layer 502 and any of the additional layers 504 may use a rectified linear unit (ReLU) as activation function. Other activation functions, such as Sigmoid, and leaky ReLU, may also be used.

Figure 8:
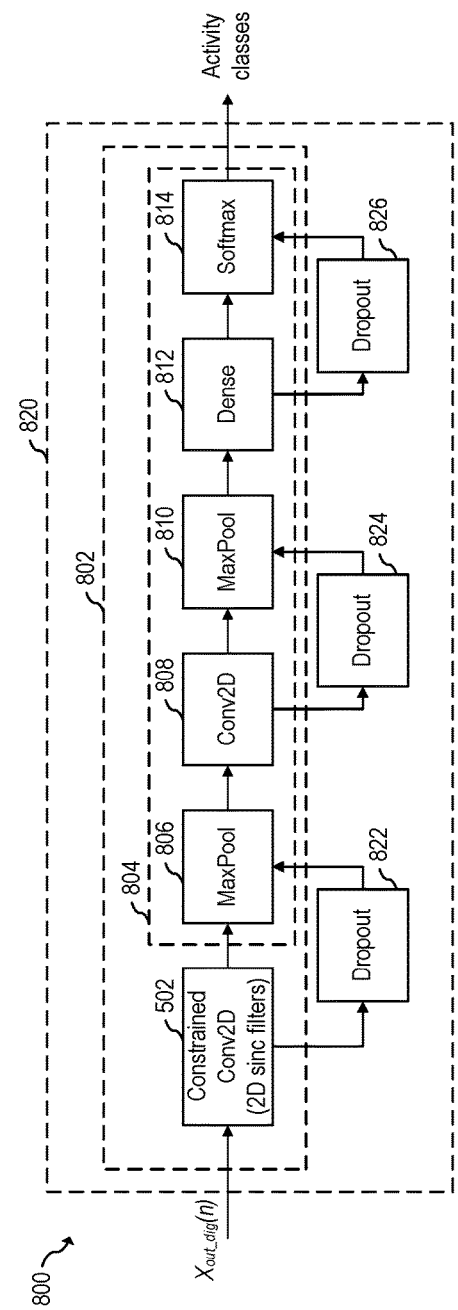
FIG. 8 shows a block diagram of a DCNN, according to an embodiment of the present invention.

FIG. 8 shows a block diagram of DCNN 800, according to an embodiment of the present invention. DCNN 800 is implemented during training as DCNN 820, and is implemented during normal operation (after training) as DCNN 802.

As shown, DCNN 800 includes constrained 2D convolutional layer 502 and additional layers 804, where additional layers 804 represent a possible implementation of additional layers 504.

As shown in FIG. 8, additional layers 804 includes, maxpool layers 806 and 810, unconstrained 2D convolutional layer 808, dense layer 812, and softmax classifier layer 814. During training, DCNN 800 additionally includes dropout layers 822, 824, and 826 after each convolutional and dense layer.

During training, DCNN 800 receives batches (e.g., of 128 samples each) of training data and generates, with softmax classifier layer 814, an M-element vector that corresponds to the classification of the respective data, where M is equal to or greater than 2. For example, in some embodiments, M is equal to 6, corresponding to activities classes: "empty room," "walking," "idle," "arm movement," "waving," and "working," for example. The output vector may be of the form ["empty room" "walking" "idle" "arm movement" "waving" "working"], for example. The training data includes a dataset that includes recordings of the five different human activities ("walking," "idle," "arm movement," "waving," and "working,") plus recordings of the empty room, where each recording of the dataset is pre-labeled with the corresponding class (e.g., "empty room," "walking," "idle," "arm movement," "waving," and "working").

In some embodiments, the output vector includes confidence values (i.e., the probability that a particular label is correct). In such embodiments, an output vector [0.01 0.75 0.1 0.5 0.4 0.5] may be interpreted as the respective data having 1% probability of corresponding to an "empty room" classification, a 75% probability of corresponding to a "walking" classification, a 10% probability of corresponding to an "idle" classification, a 5% probability of corresponding to an "arm movement" classification, a 4% probability of corresponding to an "waving" classification, and a 5% probability of corresponding to an "working" classification. In such scenario, the respective data may be assigned the classification with highest confidence (in this non-limiting example, classified as "walking").

In some embodiments, during training, constrained 2D convolutional layer 502 is initialized to cover the entire range-Doppler space. For example, in some embodiments, constrained 2D convolutional layer 502 may be initialized by directly defining 2D sinc filters. In other embodiments, constrained 2D convolutional layer 502 may be initialized by generating the 2D sinc filters using 1D sinc filters. Other initialization schemes are also possible.

For example, in some embodiments, during training, constrained 2D convolutional layer 502 is initialized with 2D sinc filters. In some embodiments, $N_{st}$ 1D sinc filters are initialized to equally divide the slow-time frequency into bands of size $$B_{st} = \frac{f_{s,st}}{2N_{st}},$$

and $N_{ft}$ 1D sinc filters are initialized to equally divide the fast-time frequency into bands of size $$B_{ft} = \frac{f_{s,ft}}{2N_{ft}}$$

where $f_{s,st}$ and $f_{s,ft}$ are the sampling frequency of the slow-time data and fast-time data, respectively, and $N_{st}$ and $N_{ft}$ are the number of filters in the slow-time and fast-time directions, respectively. The initial set of $N_{st}$ times $N_{ft}$ filters is obtained by applying the outer product of each 1D slot-time sinc filter with each 1D fast-time sinc filter, thereby covering the complete observable frequency domain. Therefore, there are no separated filters for slow-time and fast-time. By initializing the 2D sinc filters of constrained 2D convolutional layer 502 in this manner, some embodiments avoid preferential frequency areas by initialization.

Since the sampling frequency in fast-time direction $f_{s,ft}$ may be orders of magnitude higher than the sampling frequency in the slow-time direction $f_{s,st}$, in some embodiments, the cutoff frequencies and bandwidths of the short-time and fast-time filters of the constrained 2D convolutional layer 502 are normalized to a value between 0 and 1, inclusive, to, e.g., allow for equal training in both filter dimensions (slow-time and fast-time).

The unconstrained convolutional layer 808 and dense layer 812 are initialized using the "Glorot" initialization scheme, for example.

During training, the hyperparameters of constrained 2D convolutional layer 502, as well as the trainable parameters of the additional layers 804 are trained based on the training data. For example, during training, the output vector generated by DCNN 800 is compared with the pre-labels of the respective data batch, and the trainable weights of the neural network are adjusted so that the classification of a respective batch of data corresponds to the respective pre-labels. The model (the neural network 800) is refined by running a plurality of training data batches, e.g., hundreds or thousands of training data batches.

In some embodiments, an optimizer, such as an RMSprop optimizer, is used to optimize DCNN 800. Other optimizers, such as a gradient decent optimizer, and gradient decent with momentum optimizer, may also be used. In some embodiments, the learning rate is $l_r$ is 0.0001, with ρ of 0.9 and ε of $10^{-8}$. Other learning parameter values may also be used.

Dropout layers 822, 824, and 826 are used during training to help create redundancy in the neural network and prevent overfitting by randomly removing nodes (e.g., randomly zeroing weights on the previous layer) and corresponding edges to/from the removed nodes of the neural network. For example, during training, the sequence of layers is 502, 822, 806, 808, 824, 810, 812, 826, and 814. In some embodiments, 20% of the nodes are removed by each of the dropout layers 822, 824, and 826.

Constrained 2D convolutional layer 502 may be implemented with 65 filters in the slow-time dimension and 33 filters in the fast-time dimension. A different number of filters may also be used.

The maxpool layers 806 and 810 may be implemented with pooling sizes of 8×2, and 4×2, respectively. Other pooling sizes may also be used.

Unconstrained 2D convolutional layer 808 may be implemented with 50 filters of size 3×3. In some embodiments, more than 50 filters, such as 60 or more, or less than 50 filters, such as 45 filters, or less, may be used. In some embodiments, filters of size different than 3×3, such as 4×4, or 2×2, may also be used.

After maxpool layer 810, the tensor is flattened and fed into dense layer 812, which may have a size of, e.g., 32. In some embodiments, dense layer may have a size different than 32, such as higher than 32 (e.g., 35, 40, or higher), or lower than 32 (e.g., 28, 24, or lower).

After dense layer 812, softmax classifier layer 814 generates the classes. In the embodiment in which 6 classes are considered, softmax classifier 814 has a size of 6 (corresponding to each of the 6 classes). Some embodiments may be implemented softmax classifier 814 with a size smaller than 6, such as 5, 4, 3 or 2, or with a size higher than 6, such as 7, 8, 10, or higher.

Once trained, DCNN 800 may be used to classify objects, such as to classify activities of humans in scene 130. During normal operation (after training), the sequence of layers of DCNN 800 is 502, 806, 808, 810, 812, and 814. Constrained 2D convolutional layer 502 receives raw digital data $x_{out\_dig}$(n) from ADC 112 and filters it by convolving the raw digital data $x_{out\_dig}$(n) with the plurality of trained 2D sinc filters. The filtered data is pooled using maxpool layer 806, to, e.g., smoothen the data, e.g., by applying averaging. The pooled data is then filter with trained unconstrained 2D convolutional layer 808. The output of convolutional layer 808 is pooled using maxpool layer 810 to, e.g., smoothen the data, e.g., by applying averaging and, e.g., to decrease dimensionality. The tensor generated by maxpool layer 810 is then flattened and fed into dense layer 812 followed by softmax classifier layer 814. Softmax classifier layer 814 generates an output vector with probabilities associated with each classification.

Advantages of some embodiments include that, by constraining the first 2D convolutional layer to a particular filter shape (e.g., such as with 2D sinc filters), some embodiments advantageously allow for faster convergence during the training process of the neural network when compared to an unconstrained convolutional layer. In some embodiments, constraining the first 2D convolutional layer to a particular filter shape (e.g., such as with 2D sinc filters) has the additional advantage of helping to overcome the problems of getting stuck in local minima.

Figure 9:
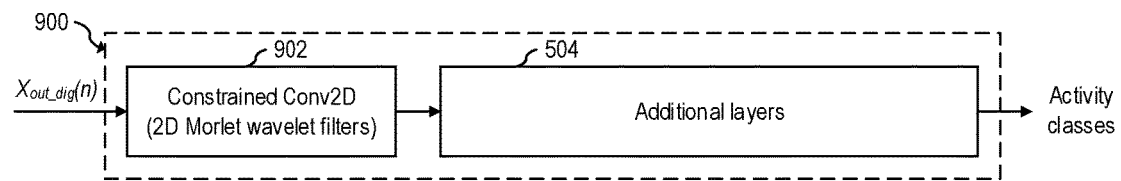
FIG. 9 shows a block diagram of a DCNN for activity classification, according to an embodiment of the present invention.

Some embodiments may implement the first constrained convolutional layer of the DCNN with filters other than 2D sinc filters. For example, FIG. 9 shows a block diagram of DCNN 900 for activity classification, according to an embodiment of the present invention. DCNN 900 operates in a similar manner as DCNN 500. DCNN 900, however, implements the first constrained 2D convolutional layer 902 with Morlet wavelet filters instead of 2D sinc filters.

A Morlet wavelet may be understood as the multiplication of an underlying frequency (carrier) by a Gaussian window (envelope). In some embodiments, each 2D Morlet wavelet filter of 2D convolutional layer 902 may be given by $$\phi_{wave}(n, m; f_c^{st}, \sigma_{st}, f_c^{ft}, \sigma_{ft}) = \\ g_{N,M}(n, m; \sigma_{st}, \sigma_{ft})\cos\left(2\pi f_c^{st} \cdot \frac{n - \lfloor\frac{N}{2}\rfloor}{N}\right)\cos\left(2\pi f_c^{ft} \cdot \frac{m - \lfloor\frac{M}{2}\rfloor}{M}\right) \quad (10)$$

where N is a slow-time filter length, n is a slow-time filter parameter index (n is an integer between 0 and N, inclusive), M is a fast-time filter length, m is a fast-time filter parameter index (m is an integer between 0 and M, inclusive), $\sigma_{st}$ is a slow-time standard deviation, $\sigma_{ft}$ is a fast-time standard deviation, $f_c^{st}$ is a slow-time center frequency, $f_c^{ft}$ is a fast-time center frequency, $f_s^{st}$ is a slow-time sampling frequency, $f_s^{ft}$ is a fast-time sampling frequency, and $g_{N,M}$(n, m; $\sigma_{st}$, $\sigma_{ft}$) may be given by $$g_{N,M}(n, m; \sigma_{st}, \sigma_{ft}) = \frac{1}{2\pi\sigma_{st}\sigma_{ft}}e^{-\left(\frac{(n-\lfloor\frac{N}{2}\rfloor)^2}{2\sigma_{st}^2} + \frac{(m-\lfloor\frac{M}{2}\rfloor)^2}{2\sigma_{ft}^2}\right)} \quad (11)$$

In the 2D Morlet wavelet filters $\phi_{wave}$(n, m; $f_{st}$, $\sigma_{st}$, $f_{ft}$, $\sigma_{ft}$) of 2D convolutional layer 902, as defined by Equation 10, the trainable parameters (the hyperparameters), are the center frequencies ($f_c^{st}$ and $f_c^{ft}$) and the standard deviations ($\sigma_{st}$ and $\sigma_{ft}$) of the wavelets. Similar to the 2D sinc filters used in constrained 2D convolutional layer 502, wavelet filters can adjust the frequency area of interest by, e.g., adjusting the center frequencies ($f_c^{st}$ and $f_c^{ft}$) of the filters. Additionally, however, wavelets can adjust the time-frequency resolution by adjusting the standard deviation ($\sigma_{st}$ and $\sigma_{ft}$) of the Gaussian part of the wavelet.

Figure 10:
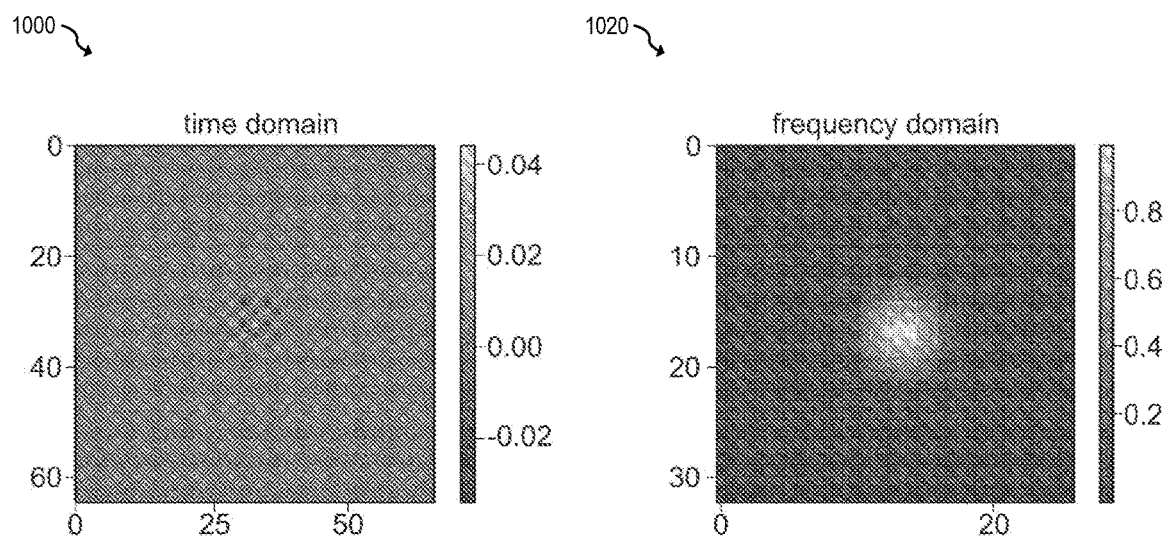
FIG. 10 shows an exemplary two-dimensional (2D) Morlet wavelet filter, as used in the constrained convolutional layer of FIG. 9, in time and frequency domain, according to an embodiment of the present invention.

As shown by Equation 10, since the Morlet wavelet is the result of the product of a cosine function and a Gaussian window function, the frequency response of the resulting Morlet wavelet also has a Gaussian shape. For example, FIG. 10 shows an exemplary 2D Morlet wavelet filter $\phi_{wave}$(n, m; $f_{st}$, $\sigma_{st}$, $f_{ft}$, $\sigma_{ft}$), as used in constrained 2D convolutional layer 902, in time and frequency domains, according to an embodiment of the present invention. As shown in FIG. 10, the Morlet wavelet filter does not exhibit a clear cutoff frequency (as shown by plot 1020). The standard deviations of the Gaussian function in time domain and in frequency domain are indirect proportional, where decreasing the width of the Gaussian function in time domains results to an increased width in the frequency domain (which shows the time-frequency resolution tradeoff).

Similar to the 2D sinc filters used in constrained 2D convolutional layer 502, the 2D Morlet wavelet filters used in constrained 2D convolutional layer 902 may include a rotational parameter for rotating the 2D Morlet wavelet filters with respect to the pseudo range domain and pseudo Doppler domain. In such embodiments, each 2D Morlet wavelet filter of 2D convolutional layer 902 may be given by $$\phi_{wave}(n,m;f_c^{st},\sigma_{st},f_c^{ft},\sigma_{ft})=g_{N,M}(n,m;\sigma_{st},\sigma_{ft})\cos(2\pi f_c^{st}t'_{st})\cos(2\pi f_c^{ft}t'_{ft}) \quad (12)$$

where $t'_{st}$ and $t'_{ft}$ may be given by Equations 8 and 9, respectively, where $\alpha$ is a rotation angle, N is a slow-time filter length, M is a fast-time filter length, $\sigma_{st}$ is a slow-time standard deviation, $\sigma_{ft}$ is a fast-time standard deviation, $f_c^{st}$ is a slow-time center frequency, $f_c^{ft}$ is a fast-time center frequency, $f_s^{st}$ is a slow-time sampling frequency, $f_s^{ft}$ is a fast-time sampling frequency, $g_{N,M}$(n, m; $\sigma_{st}$, $\sigma_{ft}$) may be given by Equation 11.

When the rotation angle $\alpha$ is equal to 0, Equation 12 can be expressed as Equation 10.

In some embodiments, during training, constrained 2D convolutional layer 902 is initialized to cover the entire range-Doppler space. For example, in some embodiments, constrained 2D convolutional layer 902 may be initialized by directly defining 2D Morlet wavelet filters. In other embodiments, constrained 2D convolutional layer 902 may be initialized by generating the 2D Morlet wavelet filters using 1D Morlet wavelet filters. Other initialization schemes are also possible.

For example, in some embodiments, $N_{st}$ 1D Morlet wavelet filters and $N_{ft}$ 1D Morlet wavelet filters are initialized to equally divide the slow-time and fast-time dimensions into equal bands. Both time axes are normalized to a value between 0 and 1, inclusive. The initial set of $N_{st}$ times $N_{ft}$ filters is obtained by applying the outer product of each 1D slot-time Morlet wavelet filter with each 1D fast-time Morlet wavelet filter, thereby covering the complete observable frequency domain. In some embodiments, the standard deviation is initialized to 0.6 (other values may also be used). In some embodiments, the trainable weights (the hyperparameters) of the Morlet wavelet filters are also normalized by mapping to a value range between 0 and 1, inclusive.

By using wavelet filters in the first constrained 2D convolutional layer of the DCNN, some embodiments advantageously allows for adjusting the time-frequency resolution of the filters of the first 2D convolutional layer by, e.g., adjusting the standard deviation of the Gaussian distributions associated with the wavelet filters.

FIGS. 11-17 show experimental setup or results of DCNN 800 and DCNN 900, implemented using radar system 300, according to embodiments of the present invention.

For generating the experimental results, radar system 300 was implemented using up-chirps, as shown in FIG. 4, with a single chirp per frame and a PRT of 1 ms, where each chirp is generated with 128 samples and has a duration of 64 μs. Each chirp had a ramp start frequency $f_{min}$ of 59.5 GHz, a ramp stop frequency $f_{max}$ of 60.5 GHz, and a bandwidth B of 1 GHz. ADC 112 was implemented as a 12-bit ADC operating with a 2 MHz sampling frequency. The range resolution was 15 cm, with a maximum range of 9.6 m, and a maximum Doppler velocity of 1.25 m/s. The elevation and azimuth of millimeter-wave radar sensor 102 (the direction of the center of the beam) were 70° and 120°, respectively.

For generating the experimental results, additional layers 504 of DCNN 900 were implemented in a similar manner as additional layers 804, and, during training, DCNN 900 included dropout layers 822, 824, and 826, as implemented in DCNN 800.

For generating the experimental results, DCNN 800 and 900 were trained for activity classification with a dataset that included five different human activities plus a recording of an empty room. DCNN 800 and 900, therefore, were trained to identify six classes: "empty room," "walking," "idle," "arm movement," "waving," and "working."

Figures 11, 12:
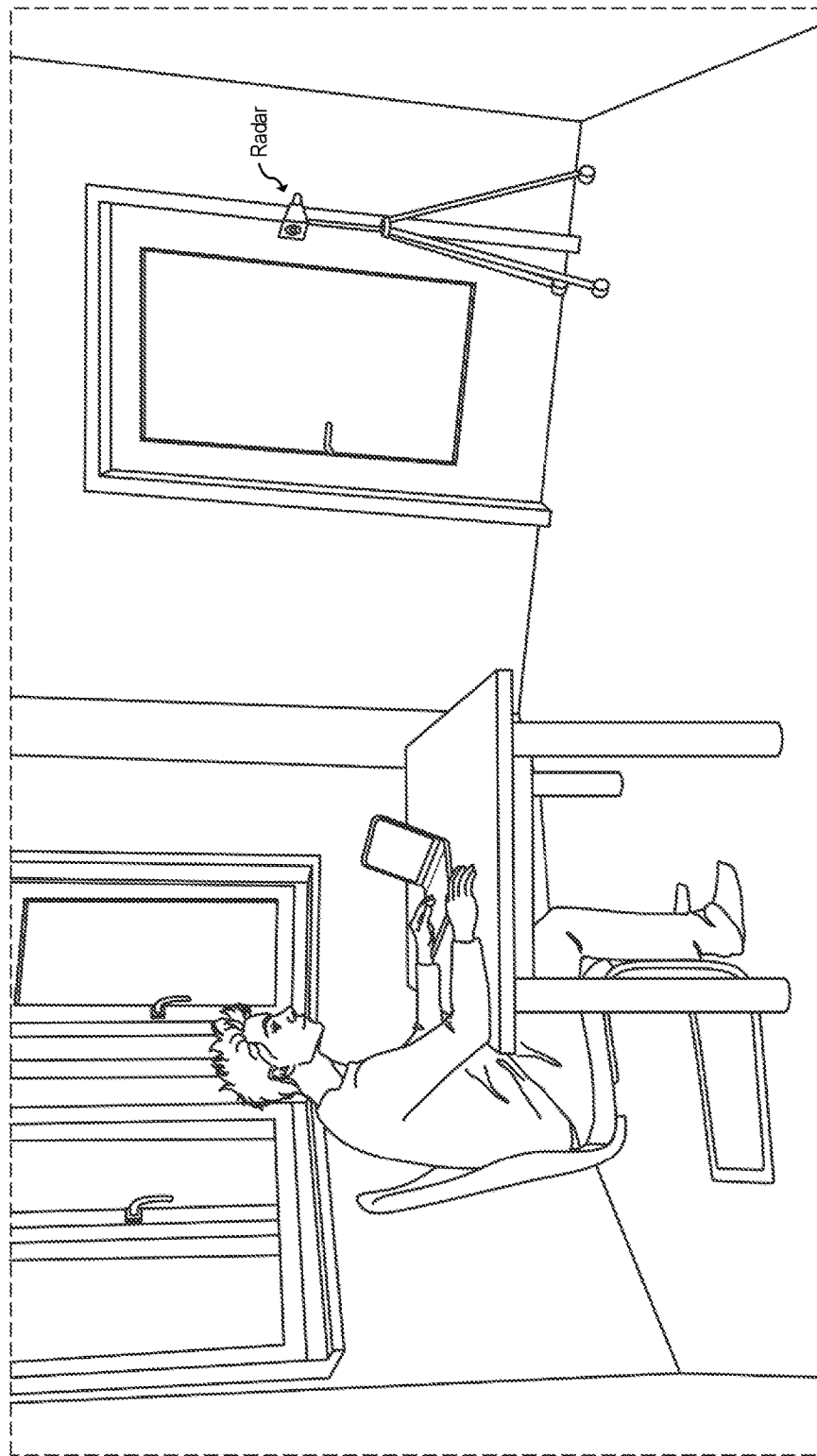

FIG. 11 shows an experimental setup for data recording with a test person performing the activity "working," according to an embodiment of the present invention. As shown in FIG. 11, millimeter-wave radar sensor 102 is located in a corner of a room, where the room includes a desk in front of millimeter-wave radar sensor 102, and a chair facing millimeter-wave radar sensor 102.

To record the class "walking," a single human randomly walked around the room of FIG. 11. The class "idle" was split into two recordings: in the first recording, a human was standing in front of the millimeter-wave radar sensor 102; and in the second recording, the human was sitting at the table facing towards the millimeter-wave radar sensor 102. To record the class "arm movement," a human was recorded randomly moving his arms while standing in the room of FIG. 11. To record the class "waving," a human was waving with his hand at different positions in the room of FIG. 11, facing towards millimeter-wave radar sensor 102. To record the class "working," a human is recorded working in his laptop while sitting in a chair, as shown in FIG. 11. To record the class "empty room," the room of FIG. 11 was recorded with the presence of a human. During training for generating the experimental results, each human activity was performed by the same human, and each class was recorded for about 18 minutes in total.

FIG. 12 shows the number of samples per class of the training dataset 1200 used to train DCNN 800 and 900 for generating the experimental results, according to an embodiment of the present invention. Each sample of training dataset 1200 has 2048 chirps. The samples were generated by cutting out 2048 chirps with an overlap of 512 chirps from the recordings. Since the PRT was 1 ms, each sample captures 2.048 seconds. As shown in FIG. 12, for each activity, about 700 samples are available for training per class.

For comparison purposes, results for three other neural networks trained using the same training dataset 1200 were also generated. A first neural network was implemented in a similar manner as DCNN 800, but having an unconstrained 2D convolutional layer instead of constrained convolutional layer 502. A second neural network was implemented receiving Doppler spectrogram as input (from step 222) instead of raw digital data from ADC 112. A third neural network was implemented receiving RDI video (from step 206) instead of raw digital data from ADC 112.

Figure 13:
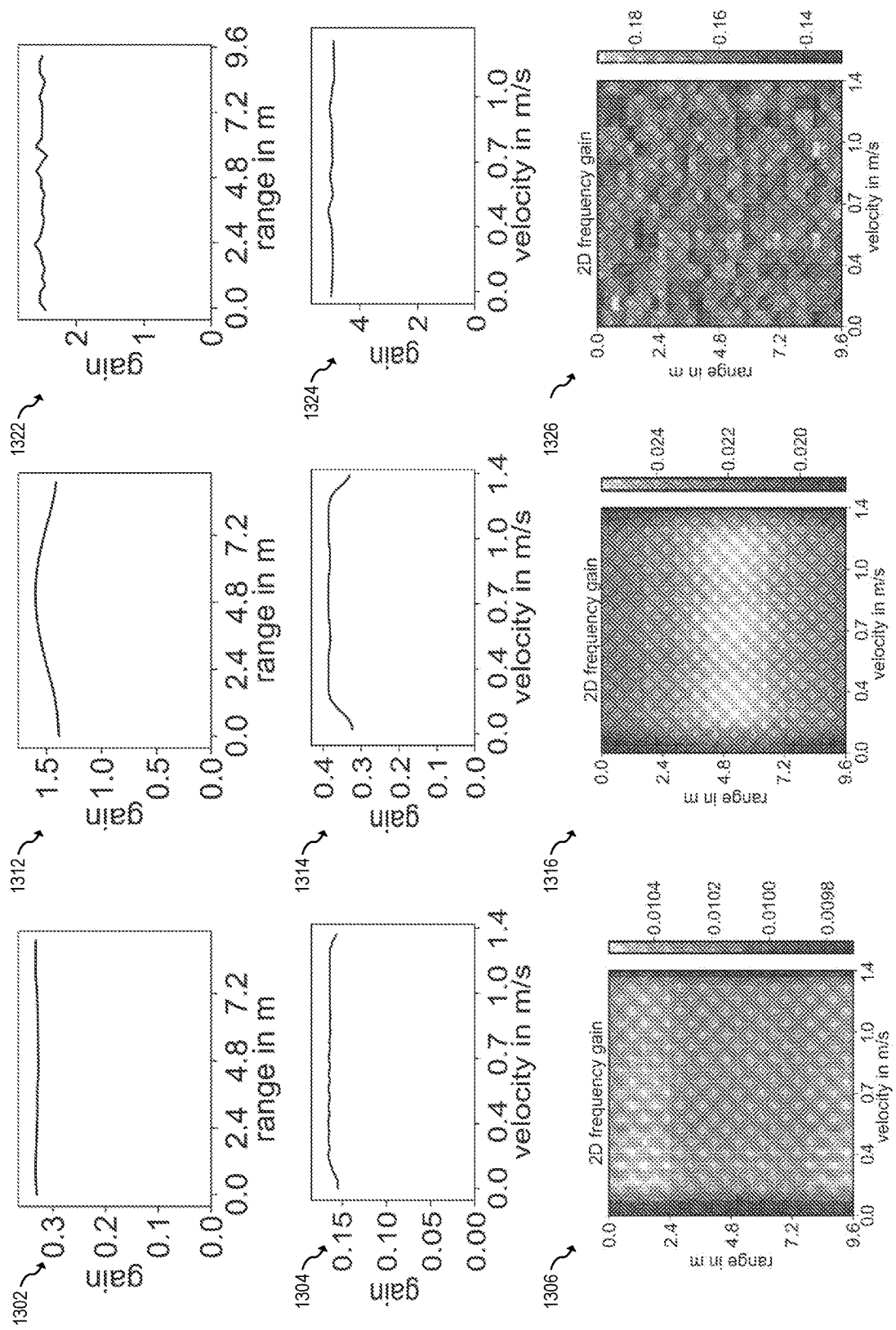

The five neural networks (DCNN 800 and 900, and the three other neural networks) were trained using training dataset 1200 for 20 epochs (except that the spectrogram-based neural network was trained for 100 epochs to allow for convergence), where an epoch indicates the number of passes of the entire training dataset the machine learning algorithm has completed FIG. 13 shows the cumulative gains of initial 2D filters of convolutional layers 502 and 902, according to embodiments of the present invention. Plots 1302, 1304, and 1306 show the initial cumulative gains (after initialization but before training) in range, velocity and the joint range-velocity gain, respectively, of the 2D sinc filters of constrained convolutional layer 502. Plots 1312, 1314, and 1316 show the initial cumulative gains (after initialization but before training) in range, velocity and the joint range-velocity gain, respectively, of the 2D Morlet wavelet filters of constrained convolutional layer 902. Plots 1322, 1324, and 1326 show the initial cumulative gains (after initialization but before training) in range, velocity and the joint range-velocity gain, respectively, of the unconstrained convolutional layer when initialized using the Glorot initialization scheme. As shown in FIG. 13, the initial gains are approximately constant over the whole space.

Figure 14:
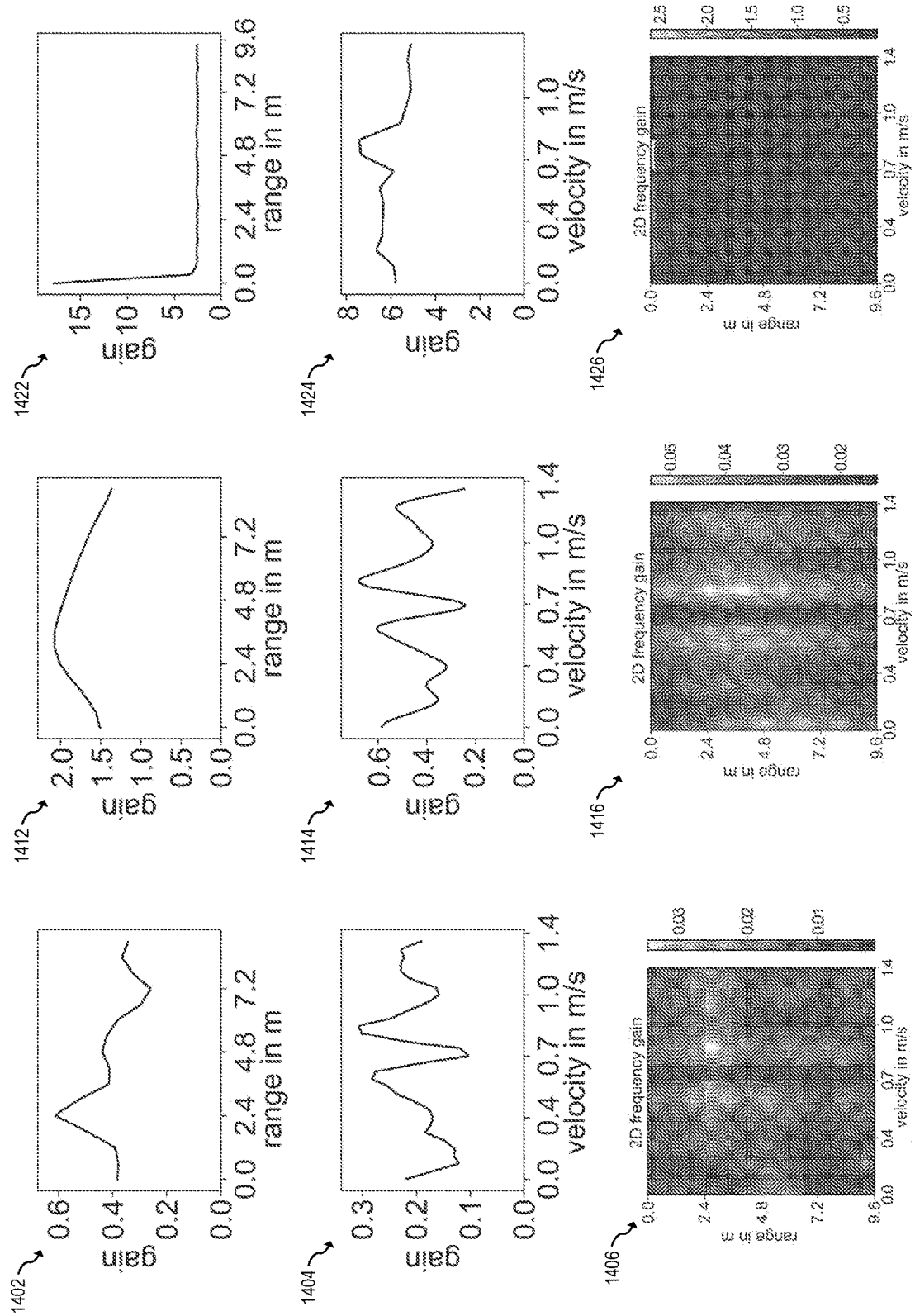

During training, the filter parameters are iteratively optimized. FIG. 14 shows the cumulative gains of 2D filters of convolutional layers 502 and 902 after 20 epochs of training, according to embodiments of the present invention. Plots 1402, 1404, and 1406 show the trained cumulative gains in range, velocity and the joint range-velocity gain, respectively, of the 2D sinc filters of constrained convolutional layer 502. Plots 1412, 1414, and 1416 show the trained cumulative gains in range, velocity and the joint range-velocity gain, respectively, of the 2D Morlet wavelet filters of constrained convolutional layer 902. Plots 1422, 1424, and 1426 show the trained cumulative gains in range, velocity and the joint range-velocity gain, respectively, of the unconstrained convolutional layer.

As shown in FIG. 14, the cumulative gain of the 2D sinc filters and the 2D Morlet wavelet filters exhibit a bandpass characteristic. Therefore, the resulting cumulative gain of the 2D sinc filters and the 2D Morlet wavelet filters are similar, except that the 2D Morlet wavelet gain is smoother due to the nature of its filter shape in frequency domain.

However, the resulting shape of the unconstrained convolutional layer is different from the shape of the 2D sinc filters or the 2D Morlet wavelet filters. A reason for the difference in shape of the unconstrained 2D convolutional layer is because the search space of the unconstrained convolutional layer is not constrained to a particular filter type. Therefore, although the 2D sinc filter and the 2D wavelet filter are within the search space of the unconstrained 2D convolutional layer, such search space is orders of magnitude larger than the search space of a 2D convolutional layer constrained to a particular filter type. Thus, arriving to a comparable solution using an unconstrained 2D convolutional layer may require longer training time compared to using a constrained 2D convolutional layer, such as 502 and 902. Additionally, an unconstrained 2D convolutional layer may get stuck during training at a local minima and may fail to arrive at a solution with a performance comparable to using a constrained 2D convolutional layer, such as 502 and 902.

FIG. 15 shows the accuracy, standard deviation, and F1-scores of DCNN 800, DCNN 900, and the three additional networks, according to an embodiment of the present invention. As shown in FIG. 15, after 20 epochs of training, DCNN 800 and DCNN 900 achieve an accuracy of 98.9% and 99.5%, respectively, which is significantly better than the accuracy achieved by the DCNN implemented using an unconstrained first 2D convolutional layer, using the spectrogram-based neural network (even though the spectrogram-based neural network was trained for 100 epochs to allow for convergence) or the RDI video-based neural network. As shown, DCNN 800 and DCNN 900 converge, achieving an accuracy of near 100% in less than 21 epochs of training.

Limits on the spectrogram-based and RDI video-based approaches are due, in part, to their respective preprocessing steps. For example, the lack of range information in spectrogram-based approaches may have a detrimental impact on class prediction, which may be exacerbated when analyzing activities of multiple humans simultaneously. As another example, the STFT used for generating the RDIs equally discretizes the range as well as the velocity domains. However, some activities, such as "idle" and "working" exhibit very slight movements. As a result, their features share similar range-Doppler bins and thus, the STFT processed data is very similar for both actions, which makes the classification task difficult.

FIG. 16 show confusion matrices for RDI video-based classification and classification using DCNN 900, according to an embodiment of the present invention. As shown in FIG. 16, the "idle" and "working" classes exhibit a significantly lower level of accuracy using RDI video-based neural network classification (as shown by confusion matrix 1602) when compared with using DCNN 900 (as shown by confusion matrix 1622).

Advantages of some embodiments include that, by allowing the neural network to operate directly from raw digital data (e.g., from ADC 112) instead of using preprocessing steps (such as spectrogram-based or RDI video-based preprocessing), better accuracy is achieved.

Although using an unconstrained 2D convolutional layer that directly operates on raw digital data (e.g., from ADC 112) may not exhibit the limitations of spectrogram-based or RDI-based implementations, constraining the search space using specific types of filters, such as 2D sinc filters and 2D wavelet filters leads to a reduction in the search space and advantageously allows some embodiments to arrive to a solution that is at least close to the global minima (the global optimum) while significantly reducing the training effort when compared to using unconstrained convolutional layer.

FIG. 17 shows model sizes of DCNN 800, DCNN 900, and a DCNN implemented using an unconstrained 2D convolutional layer as the first layer, according to an embodiment of the present invention. As shown, layer 502 was implemented with 64 filters of 65 by 33, layer 902 was implemented with 64 filters of 129 by 33, and unconstrained convolutional layer was implemented with 64 filters of 65 by 33.

As shown in FIG. 17, DCNN 800 and DCNN 900 have a size that is less than half of the size of the unconstrained DCNN. The reason for such smaller size is because the first layer of DCNN 800 and 900 is significantly smaller than the size of the first layer of the unconstrained 2D convolutional layer. The reason for the smaller size of layers 502 and 902 is that only four hyperparameters are trainable (64 filters times 4 hyperparameters equals 256), with the rest of the weights being fixed (compared with the unconstrained convolutional layer, in which all weights are trainable).

FIG. 18 shows a block diagram of DCNN 1800 for target and/or activity classification, according to an embodiment of the present invention. DCNN 1800 includes constrained 2D convolutional layer 1802 and a plurality of additional layers 504. DCNN 1800 may be implemented, e.g., in AI accelerator 322. In some embodiments, constrained convolutional layer 1802 is a constrained L dimensional convolutional layer, where L is a positive integer greater than or equal to 2.

Constrained 2D convolutional layer 1802 may be implemented as constrained 2D convolutional layer 502 or 902. In some embodiments, constrained 2D convolutional layer 1802 may be implemented using a Fractional Fourier Transform or using a Discrete Cosine Transform filters. Other filter types that include the global minima within their search space may also be used. In some embodiments, filters with a search space that includes only local minima may also be used.

In some embodiments, the filter kernels of constrained 2D convolutional layer 1802 have a size of 10×10 or higher, such as 65×33, for example.

DCNN 1800 may be used for human activity classification, e.g., in a similar manner as DCNN 800 and DCNN 900. DCNN 1800 may also be used for other types of classification. For example, in some embodiments, DCNN 1800 may be used for gesture sensing applications, in which each gesture (e.g., a human gesture, such as gesturing with the hands) corresponds to a class. In such embodiments, DCNN 1800 is trained using a dataset based on the gestures to be recognized.

In some embodiments, DCNN 1800 may be used for people detection applications, in which objects are classified as humans or not humans. In such embodiments, DCNN 1800 is trained using a dataset based on humans and non-humans.

Some embodiments may implement other types of classifications. For example, in some embodiments, the set of classes include a class indicative of the number of humans present (e.g., to count the number of humans in a room). In some embodiments, the set of classes include a class indicative of the presence of a human, and a class indicative of the absence of human. Other classifications are also possible.

Some embodiments implement a multi-layer approach to the first layers of the DCNN 1800. For example, in some embodiments, additional constrained convolutional layers follow the first constrained convolutional layer. For example, FIG. 19 shows a block diagram of DCNN 1900 for target and/or activity classification, according to an embodiment of the present invention. DCNN 1900 is a possible implementation of DCNN 1800 and includes constrained 2D convolutional layer 1802 and a plurality of additional layers 1904. DCNN 1900 may be implemented, e.g., in AI accelerator 322.

Additional layers 1904 include a second constrained 2D convolutional layer 1902, and a plurality of additional layers 1906. In some embodiments, additional layers 504 may be implemented as additional layers 1904. In some embodiments, additional layers 1906 may be implemented as additional layers 804. Other implementations are also possible.

In some embodiments, filters implemented with constrained convolutional layer 1802 and/or constrained convolutional layer 1902, and/or additional layers 1906 can be complex. For example, in some embodiments, learned cosine kernels are implemented as complex kernels, in which the same real kernel is phase-shifted by 90° and convolved with the input.

In some embodiments, constrained convolutional layer 1902 may be implemented as an L-dimensional convolutional layer, where L is a positive integer greater than or equal to 2. The number of dimensions of constrained convolutional layer 1902 may be the same or different than the number of dimensions of constrained convolutional layer 1802.

DCNN 1900 operates in a similar manner as DCNN 1800. DCNN 1900, however, includes second constrained 2D convolutional layer 1902 that operates in combination with the first constrained 2D convolutional layer 1802. For example, in some embodiments, the first constrained 2D convolutional layer 1802 implements a plurality of coarse filters that generate respective channels of data. The data within each channel of data is then downsampled (e.g., by using a stride greater than 1 in the convolution or pooling layer), e.g., to reduce computational complexity. The second constrained 2D convolutional layer 1902 then operates only within the previous filtered frequency areas of the respective channels instead of covering the entire observable search space.

Figure 20:
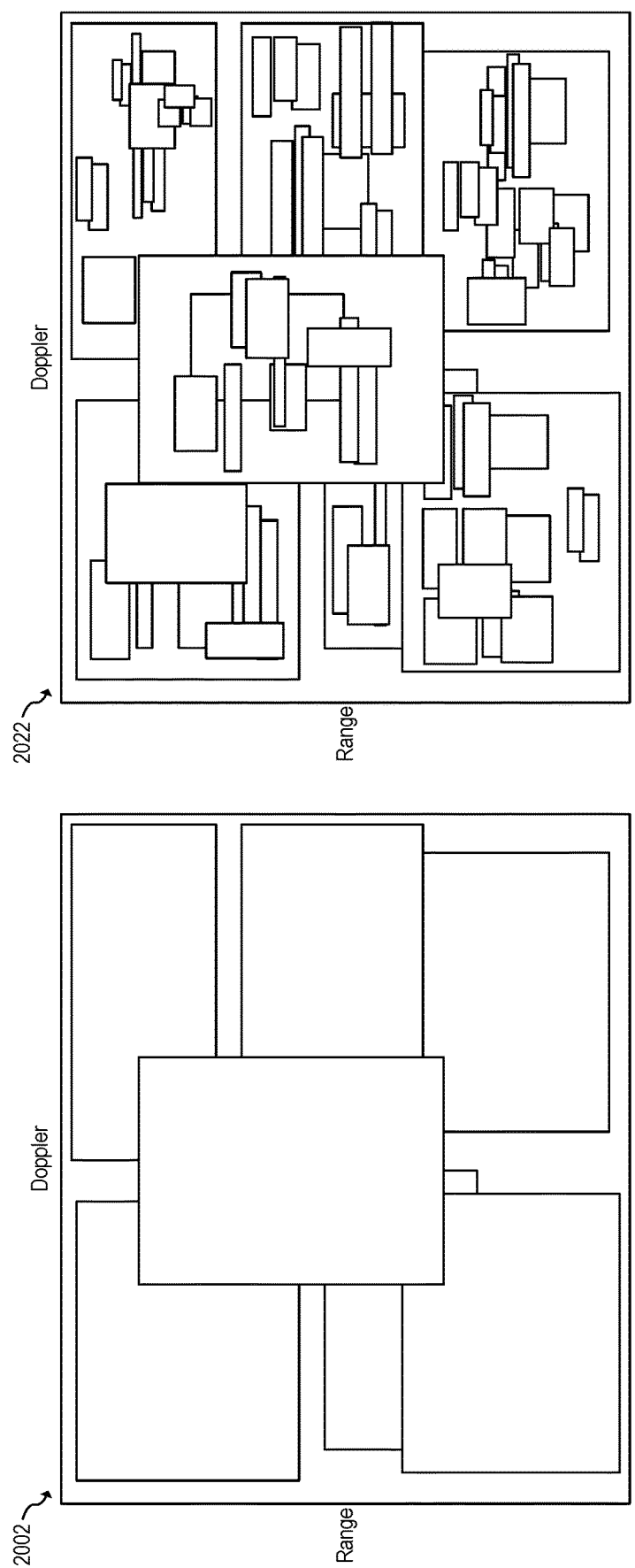
FIG. 20 show exemplary plots of the frequency response of first and second constrained 2D convolutional layers of FIG. 20, respectively, according to an embodiment of the present invention.

FIG. 20 shows exemplary plots 2002 and 2022 of the frequency response of first and second constrained 2D convolutional layers 1802 and 1902, respectively, according to an embodiment of the present invention. In the embodiment of FIG. 20, 2D sinc filters were used to implement the first and second constrained 2D convolutional layers 1802 and 1902. Other embodiments may use other filter types.

In some embodiments, the first and second constrained 2D convolutional layers 1802 and 1902 may be implemented with filters of different type. For example, in some embodiments, the first constrained 2D convolutional layer 1802 may be implemented with 2D sinc filters while the second constrained 2D convolutional layer 1902 may be implemented with 2D Morlet wavelet filters. Other implementations are also possible.

As shown in plot 2002, the first constrained 2D convolutional layer 1802 uses coarse filters that are trained to adjust their cutoff frequencies based on the training dataset. As shown in plot 2022, the filters of second constrained 2D convolutional layer 1902 are also trained to adjust their cutoff frequencies based on the training dataset, but their search space is restricted to be within the cutoff frequencies determined by the first constrained 2D convolutional layer 1802.

In some embodiments, the first and second constrained 2D convolutional layers 1802 and 1902 are trained simultaneously. For example, in some embodiments, L2 norm conditions the search space of the filters of second constrained 2D convolutional layer 1902 (as a soft constraint). In some embodiments, explicit boundaries condition the search space of the filters of second constrained 2D convolutional layer 1902 (hard constraint).

As shown, e.g., in FIG. 18, DCNN 1800 may generate an output that corresponds to a classification of a target (e.g., human activity classification, gesture recognition, people detection, people counting, etc.) based, e.g., on a predefined set of classes. In some embodiments, DCNN 1800 may generate other outputs, in addition to, or instead of, an output indicative of the classification of a target, e.g., based on a predefined set of classes. For example, FIG. 21 shows a block diagram of DCNN 1800 for generating 2D radar images, according to an embodiment of the present invention.

As shown in FIG. 21, DCNN 1800 can be trained to produce radar images based on raw digital data $x_{out\_dig}(n)$ from ADC 112. In some embodiments, DCNN 1800 may produce 2D radar images, such as range-Doppler images (RDIs), range-angle images (RAIs), and Doppler-angle images (DAIs), for example. Some embodiments, thus, may implement pre-processing and feature extractions steps (e.g., steps 205 and 206 of FIGS. 2A, and steps 205 and 222 of FIG. 2B) implicitly by the DCNN 1800.

DCNN 1800 may be trained to produce radar images by using a training dataset generated from (e.g., radar and/or camera) recordings, e.g., of one or more humans performing one or more activities in scene 130, such as walking, working, standing, waving, arm movement, etc. Each sample of the training dataset is pre-labeled with a corresponding 2D radar image, e.g., with an artificial filter manually removing the ghost targets and adding real targets whenever missed in the generated 2D radar image. The difference between the obtained 2D image (at the output of DCNN 1800) and the corresponding pre-labeled 2D image is used as the error for training DCNN 1800.

FIG. 22 shows exemplary 2D radar images 2202 and 2222 during training of DCNN 1800, according to an embodiment of the present invention. Radar image 2222 is a pre-labeled 2D RDI that corresponds to a recording of 4 humans as they walk inside a room.

As shown, radar image 2222 shows 4 identified targets 2204, 2206, 2208, and 2210. For example, in some embodiments, radar image 2222 is a matrix in which a 1 represents that a target is located at that identified range-velocity point, and a 0 represents that no target is located at that range-velocity point.

During training, for example, the recording of the 4 humans walking inside the room is fed to DCNN 1800, in which, for example, 2D radar image 2202 is generated. As shown, there are differences between the generated radar image 2202 and the pre-labeled radar image 2222. For example, human 2210 is not detected in radar image 2202. The difference between radar images 2202 and 2222 represents the error, which is used to optimize DCNN 1800, e.g., by adjusting the hyperparameters of constrained convolutional layer 1802 and/or other weights of additional layers 504, e.g., based on a loss function, such as means square error.

In some embodiments, the pre-labeled radar images are generated by using, e.g., a camera that records images simultaneously with the radar recordings for generating the training dataset. In some embodiments, the pre-labeled radar images are generated, e.g., by performing steps 205 and 206 on the radar recordings, instead of or in addition to using the camera images.

In some embodiments, the pre-labeled images are manually labeled by a user based on knowledge of the targets and corresponding activities. In some embodiments, at least some of the pre-labeled radar images are generated synthetically. For example, in some embodiments, radar images with multiple humans are synthetically computed by performing a data augmentation step during training based on multiple single human radar images, e.g., by superimposing multiple, single human, radar images. For example, two single human images, in which the humans are not close together in the corresponding radar images, are superimposed to generate a two human radar image.

Although RDIs have been used to illustrate a possible method of training DCNN 1800 for generating radar images, it is understood that other radar images may also be used, such as RAIs and DAIs, for example.

In some embodiments, the output of DCNN 1800 is further processed, e.g., to track targets, count people, or other applications. For example, FIG. 23 shows a schematic diagram of radar system 2300, according to an embodiment of the present invention. Radar system 2300 includes millimeter-wave radar sensor 102, AI accelerator 322, and processor 1910.

As shown in FIG. 23, processor 2310 may be to post-process the output of DCNN 1800, which includes information about targets in scene 130, such as target classification information and/or radar images. For example, in some embodiments, during normal operation, radar images with target location information (such as radar image 2222) are fed to processor 2310, in which targets are clustered, e.g., to group detected targets as a single target (e.g., to group detected hands, torso and feet as a single human target).

Processor 2310 may cluster targets based on the output of DCNN 1800 using, for example, density-based spatial clustering of applications with noise (DBSCAN), other clustering methods may also be used.

In some embodiments, processor 2310 is used to track targets and the activities of the targets. For example, in some embodiments, processor 2310 may track which activities a detected human target is performing over time, such as sitting, then standing, then walking, then working, etc.

In some embodiments, a Kalman filter may be used to track one or more targets based on radar images received from DCNN 1800. In some embodiments, the Kalman filter also tracks associated target classifications (e.g., associated human activities, gestures, etc.) of the detected targets based on a classification output of DCNN 1800. Tracking methods other than using a Kalman filter, or in addition to using a Kalman filter, may also be used. For example, some embodiments may use a particle filter instead of a Kalman filter, for tracking targets.

Processor 2310 may be used for other post-processing activities, in addition to, or instead of, clustering and/or tracking targets. Processor 2310 may be implemented in a similar manner as processor 120. In some embodiments, processor 2310 and AI accelerator 322 are integrated in a single integrated circuit (IC).

Advantages of some embodiments include minimizing the data flow of the radar system. For example, in radar system 2300, data flows from millimeter-wave radar 102, to AI accelerator 322 (e.g., for classification), then to processor 2310 (for post-processing). An approach based on radar system 100 would instead exhibit a data flow from millimeter-wave radar 102, to processor 120 (for preprocessing), then to AI accelerator 122 (for classification), then back to processor 120 (for post-processing).

In some embodiments, a first constrained convolutional layer may be used to feed its output to a plurality of additional layers paths. For example, FIG. 24 shows a block diagram of DCNN 2400, according to an embodiment of the present invention. DCNN 2400 may be used, for example, for generating target localization data.

DCNN 2400 includes constrained 3D convolutional layer 2402, and additional layers 2404, 2406, and 2408. It is understood that constrained 3D convolutional layer 2402 is a possible implementation of constrained convolutional layer 1802. Each of additional layers 2404, 2406, and 2408 may be implemented, e.g., as additional layers 504. In some embodiments, additional layers 2404, 2406, and 2408, have the same architecture (e.g., the same sequence of identical layers), and may be initialized in a similar manner (although the weights of the respective trainable parameters after training may differ), e.g., but performing pointwise convolutions along different axis. For example, in some embodiments, additional layers 2404, 2406, and 2408 keep all layer parameters the same, but additional layers 2404 perform pointwise convolution along channels dimension to generate reconstructed RDIs, additional layers 2406 perform pointwise convolution along fast-time dimension to generate reconstructed DAIs; additional layers 2408 perform pointwise convolution along slow-time dimension to generate reconstructed RAIs.

In other embodiments, some, or all of additional layers 2404, 2406, and 2408 may have different architectures and/or may be initialized in a different manner from each other.

Integration step 2410 may be performed on the outputs of additional layers 2404, 2406, and 2408 to generate localization data. For example, in some embodiments, integration step 2410 is implemented with soft information transfers between layers, such as by using softmax layers (e.g., with connections between additional layers 2402, 2406 and/or 2408). Other embodiments may implement integration step 2410 by performing signal processing operations to integration the reconstructed RDIs, DAIs and/or RAIs to generate localization data.

In some embodiments, constrained convolutional layer 2402 is implemented with a plurality of 3D sinc filters. In some embodiments, each of the dimensions of the 3D sinc filters corresponds to slow-time, fast-time, and channels, respectively, where each channel corresponds to a data stream from a (real or virtual) RX antenna associated with millimeter-wave radar sensor 102. For example, in an embodiment in which 2 real antennas are used for receiving reflected radar signals 108, the number of channels is 2. More than 2 antennas may also be used.

In some embodiments, the 3D sinc filters of c constrained convolutional layer 2402 are phase-shifted. For example, if one channel has kernel $w_1$, the next channel is applied $w_1 \cdot \cos(\theta)$, the next channel is applied $w_1 \cdot \cos(2\theta)$, and so on, where $\theta$ is the angle of the target.

The RX antennas used for each channel may be implemented in any way known in the art. For example, in some embodiments, 1 TX antenna and 3 TX antennas are implemented in an L-shape configuration for a 3-channel implementation. Other implementations are also possible.

During normal operation, the output of constrained 3D convolutional layer is fed to one or more paths of additional layers, such as additional layers 2404, 2406 and/or 2408. The output of the one or more additional layers may be integrated by integration step 2410 to generate localization data along range, Doppler and angle. As shown in FIG. 24, the localization data may have 3 dimensions, such as range, Doppler, and angle. In some embodiments, the generated localization data may be in the form of 2D range-Doppler images (RDIs), 2D range-angle images (RAIs) and/or 2D Doppler-angle images (DAIs).

Additional layers 2404 receives the output from constrained 3D convolutional layer 2402 and generates reconstructed RDIs, (e.g., similar to RDI 2222), in which the location of detected targets are identified in the range-Doppler domain. As shown in FIG. 24, additional layers 2404 operate on the received input by pointwise convolving along the channel domain, thus generating slices along fast-time-slow-time domain, where pointwise convolution along a first domain may be understood as learned weighted summation along such first domain.

Additional layers 2406 receives the output from constrained 3D convolutional layer 2402 and generates reconstructed DAI, in which the locations of detected targets are identified in the Doppler-angle domain. As shown in FIG. 24, additional layers 2406 operate on the received input by pointwise convolving along fast-time, thus generating slices along Doppler-channel domain.

Additional layers 2408 receives the output from constrained 3D convolutional layer 2402 and generates reconstructed RAI, in which the locations of detected targets are identified in the range-angle domain. As shown in FIG. 24, additional layers 2408 operate on the received input by pointwise convolving along slow-time, thus generating slices along fast time-channel domain.

In some embodiments, only two of the additional layers (e.g., only additional layers 2404 and 2408) are implemented.

In some embodiments, the integration layer 2410 may be omitted. For example, in some embodiments, only one of the additional layers (such as one of additional layers 2404, 2406, or 2408) is implemented.

In an embodiment having 2 channels, constrained 3D convolutional layer 2402 may be implemented with, e.g., $F_1 \times F_2$ 2D sinc filters associated with the first channel, and $F_1 \times F_2$ 2D sinc filters associated with the second channel filters, where, e.g., the second $F_1 \times F_2$ 2D sinc filters associated with the second channel are implemented as $\cos(\theta)$ times the $F_1 \times F_2$ 2D sinc filters associated with the first channel. In some embodiments, the K kernels additionally provide the sum of the results of the $F_1 \times F_2$ 2D sinc filters associated with the first channel, and the results of $F_1 \times F_2$ 2D sinc filters associated with the second channel filters into an $F_1 \times F_2$ matrix. Therefore, the K kernels would transform the input along channels from 2 to K. In some embodiments, $F_1$ is equal to 36, $F_2$, is equal to 65. Other values for $F_1$ and $F_2$ are also possible.

In some embodiments, the kernel values are normalized so that the 2D sinc filters associated with the first channel have a value of $w_1=1$ for all angles $\theta$. Each of the $F_1 \times F_2$ filters associated with the second channel may be given by $$sinc_{ch2} = w_1 \cos\left(\frac{2\pi d \sin(\theta)}{\lambda}\right) \quad (13)$$

where d is the distance between the two RX antennas, $\lambda$ is the wavelength of the transmitted signal (e.g., the center frequency of the chirp), and $\theta$ is the angle of the target.

In some embodiments, $$d/\lambda = 0.5 \text{ and } \cos\left(\frac{2\pi d \sin(\theta)}{\lambda}\right) = \cos(\pi \sin(\theta)),$$

where $\theta \in [-90, 90]$ and $\cos(\pi \sin(\theta)) \in [\cos(-\pi), \cos(\pi)]$. Thus, in some embodiments, each $k^{th}$ trainable kernels are $\cos(-\pi + k*(2\pi/K))$, and the trained spatial frequency are $$\cos\left(-\pi + k*\left(\frac{2\pi}{K}\right) + bw_a\right),$$

K is the number of angle kernels, and $bw_a$ is the learnable parameter. Thus, the learned kernels for the second channel is $$w_2 = w_1 \cos\left(-\pi + k*\left(\frac{2\pi}{K}\right) + bw_a\right).$$

In some embodiments, unlike fast-time and slow-time domain where the learned kernels are applied through convolution operation, the learned kernels along antennas are applied through 1×1 convolution/fully-connected connections. In an embodiment with K=29 (angle kernels), and M overall kernels, the 4D kernel map after constrained 3D convolutional layer 2402 is 128×32×29×M.

In some embodiments, these kernels can be implemented through complex weights, where the $k^{th}$ kernel can be expressed as $$w_2^k = w_1^k \left(\cos\left(-\pi + k*\left(\frac{2\pi}{K}\right) + bw_a\right) + j\sin\left(-\pi + k*\left(\frac{2\pi}{K}\right) + bw_a\right)\right) \quad (14)$$

Example embodiments of the present invention are summarized here. Other embodiments can also be understood from the entirety of the specification and the claims filed herein.

Example 1. A method including: transmitting a plurality of radar signals using a millimeter-wave radar sensor towards a target; receiving a plurality of reflected radar signals that correspond to the plurality of transmitted radar signals using the millimeter-wave radar; mixing a replica of the plurality of transmitted radar signals with the plurality of received reflected radar signals to generate an intermediate frequency signal; generating raw digital data based on the intermediate frequency signal using an analog-to-digital converter; processing the raw digital data using a constrained L dimensional convolutional layer of a neural network to generate intermediate digital data, where L is a positive integer greater than or equal to 2, and where the neural network includes a plurality of additional layers; and processing the intermediate digital data using the plurality of additional layers to generate information about the target.

Example 2. The method of claim 1, where generating information about the target includes classifying the target based on a set of classes.

Example 3. The method of one of examples 1 or 2, where generating information about the target includes providing a location of the target using a radar image.

Example 4. The method of one of examples 1 to 3, where the radar image is a range-Doppler image (RAI), a range-angle image (RAI) or a Doppler-angle image (DAI).

Example 5. The method of one of examples 1 to 4, where L is equal to 2.

Example 6. The method of one of examples 1 to 5, where a kernel size of a filter of the constrained L dimensional convolutional layer is higher than 10 by 10.

Example 7. The method of one of examples 1 to 6, where processing the raw digital data using the constrained L dimensional convolutional layer includes processing the raw digital data using a 2D sinc filter of the constrained L dimensional convolutional layer.

Example 8. The method of one of examples 1 to 7, where the 2D sinc filter is defined by $$sinc_{2D}(n, m; f_l^{st}, b_{st}, f_l^{ft}, b_{ft}) = w(n, m) h_{N, f_s^{st}}(n; f_l^{st}, b_{st}) h_{M, f_s^{ft}}(m; f_l^{ft}, b_{ft})$$

where $$h_{N, f_s^{st}}(n; f_l^{st}, b_{st})$$

is a slow-time 1D sinc filter, N is a length of the slow-time 1D sinc filter, $f_l^{st}$ is a lower cutoff frequency of the slow-time 1D sinc filter, $b_{st}$ is a bandwidth of the slow-time 1D sinc filter, n is an integer between 0 and N, inclusive, $$h_{M, f_s^{ft}}(m; f_l^{ft}, b_{ft})$$

is a fast-time 1D sinc filter, M is a length of the fast-time 1D sinc filter, $f_l^{ft}$ is a lower cutoff frequency of the fast-time 1D sinc filter, $b_{ft}$ is a bandwidth of the fast-time 1D sinc filter, m is an integer between 0 and M, inclusive, w(n,m) is a 2D cosine weighting function, wherein the slow-time 1D sinc filter and the fast-time 1D sinc filter are defined by $$h_{K, f_s}(k, f_l, b) = 2(f_l + b) sinc\left(2(f_l + b) \cdot \frac{k - \left\lfloor \frac{K}{2} \right\rfloor}{f_s}\right) - 2f_l \cdot sinc\left(2f_l \cdot \frac{k - \left\lfloor \frac{K}{2} \right\rfloor}{f_s}\right)$$

where K is a length of a 1D sinc filter, k is an integer between 0 and K, inclusive, $f_s$ is a sampling frequency of a signal to be filtered, $f_l$ is a lower cutoff frequency, b is a bandwidth of the 1D sinc filter, and k is a filter parameter index.

Example 9. The method of one of examples 1 to 7, where the 2D sinc filter is defined by $$\phi_{sinc}(n, m; f_l^{st}, b_{st}, f_l^{ft}, b_{ft}) = 4w(n, m)$$

$$((f_l^{st} + b_{st})(f_l^{ft} + b_{ft}) sinc(2(f_l^{st} + b_{st}) t'_{st}, 2(f_l^{ft} + b_{ft}) t'_{ft})$$

$$-(f_l^{st} + b_{st}) f_l^{ft} sinc(2(f_l^{st} + b_{st}) t'_{st}, 2 f_l^{ft} t'_{ft})$$

$$-f_l^{st}(f_l^{ft} + b_{ft}) sinc(2 f_l^{st} t'_{st}, 2(f_l^{ft} + b_{ft}) t'_{ft}) + f_l^{st} f_l^{ft} sinc(2 f_l^{st} t'_{st}, 2 t'_{ft}))$$

where $sinc(x, y) = \frac{\sin(\pi x)\sin(\pi y)}{\pi^2 xy}$ $$t'_{st} = \frac{n - \left\lfloor \frac{N}{2} \right\rfloor}{f_s^{st}} \cos(\alpha) - \frac{m - \left\lfloor \frac{M}{2} \right\rfloor}{f_s^{ft}} \sin(\alpha)$$

$$t'_{ft} = \frac{n - \left\lfloor \frac{N}{2} \right\rfloor}{f_s^{st}} \sin(\alpha) + \frac{m - \left\lfloor \frac{M}{2} \right\rfloor}{f_s^{ft}} \cos(\alpha)$$

where $\alpha$ is a rotation angle and wherein $\alpha$ is different from 0, wherein N is a length of the 2D sinc filter in slow-time, $f_l^{st}$ is a lower cutoff frequency of the 2D sinc filter in slow-time, $b_{st}$ is a bandwidth of the 2D sinc filter in slow-time, n is an integer between 0 and N, inclusive, M is a length of the 2D sinc filter in fast-time, $f_l^{ft}$ is a lower cutoff frequency of the 2D sinc filter in fast-time, $b_{ft}$ is a bandwidth of the 2D sinc filter in fast-time, m is an integer between 0 and M, inclusive, and w(n,m) is a 2D cosine weighting function.

Example 10. The method of one of examples 1 to 5, where processing the raw digital data using the constrained L dimensional convolutional layer includes processing the raw digital data using a 2D Morlet wavelet filter of the constrained L dimensional convolutional layer.

Example 11. The method of one of examples 1 to 5 or 10, where the 2D Morlet wavelet filter is defined by $$\phi_{wave}(n, m; f_c^{st}, \sigma_{st}, f_c^{ft}, \sigma_{ft}) =$$

$$g_{N,M}(n, m; \sigma_{st}, \sigma_{ft}) \cos\left(2\pi f_c^{st} \cdot \frac{n - \left\lfloor \frac{N}{2} \right\rfloor}{f_s^{st}}\right) \cos\left(2\pi f_c^{ft} \cdot \frac{m - \left\lfloor \frac{M}{2} \right\rfloor}{f_s^{ft}}\right)$$

where N is a slow-time filter length, n is an integer between 0 and N, inclusive, M is a fast-time filter length, m is an integer between 0 and M, inclusive, $\sigma_{st}$ is a slow-time standard deviation, $\sigma_{ft}$ is a fast-time standard deviation, $f_c^{st}$ is a slow-time center frequency, $f_c^{ft}$ is a fast-time center frequency, $f_s^{st}$ is a slow-time sampling frequency, $f_s^{ft}$ is a fast-time sampling frequency, and wherein $g_{N,M}(n, m; \sigma_{st}, \sigma_{ft})$ is defined by $$g_{N,M}(n, m; \sigma_{st}, \sigma_{ft}) = \frac{1}{2\pi \sigma_{st} \sigma_{ft}} e^{-\left(\frac{(n - \lfloor N/2 \rfloor)^2}{2\sigma_{st}^2} + \frac{(m - \lfloor M/2 \rfloor)^2}{2\sigma_{ft}^2}\right)}.$$

Example 12. The method of one of examples 1 to 5, or 10, where the 2D Morlet wavelet filter is defined by $$\phi_{wave}(n, m; f_c^{st}, \sigma_{st}, f_c^{ft}, \sigma_{ft}) =$$

$$g_{N,M}(n, m; \sigma_{st}, \sigma_{ft}) \cos(2\pi f_c^{st} t'_{st}) \cos(2\pi f_c^{ft} t'_{ft}) \text{ where}$$

$$t'_{st} = \frac{n - \left\lfloor \frac{N}{2} \right\rfloor}{f_s^{st}} \cos(\alpha) - \frac{m - \left\lfloor \frac{M}{2} \right\rfloor}{f_s^{ft}} \sin(\alpha)$$

$$t'_{ft} = \frac{n - \left\lfloor \frac{N}{2} \right\rfloor}{f_s^{st}} \sin(\alpha) - \frac{m - \left\lfloor \frac{M}{2} \right\rfloor}{f_s^{ft}} \cos(\alpha)$$

wherein $\alpha$ is a rotation angle and wherein $\alpha$ is different from 0, wherein N is a slow-time filter length, n is an integer between 0 and N, inclusive, M is a fast-time filter length, m is an integer between 0 and M, inclusive, $\sigma_{st}$ is a slow-time standard deviation, $\sigma_{ft}$ is a fast-time standard deviation, $f_c^{st}$ is a slow-time center frequency, $f_c^{ft}$ is a fast-time center frequency, $f_s^{st}$ is a slow-time sampling frequency, $f_s^{ft}$ is a fast-time sampling frequency, and wherein $g_{N,M}(n,m,\sigma_{st},\sigma_{ft})$ is defined by $$g_{N,M}(n,m;\sigma_{st},\sigma_{ft}) = \frac{1}{2\pi\sigma_{st}\sigma_{ft}} e^{-\left(\frac{(\frac{n}{N}-|\frac{N}{2}|)^2}{2\sigma_{st}^2} + \frac{(\frac{m}{M}-|\frac{M}{2}|)^2}{2\sigma_{ft}^2}\right)}.$$

Example 13. The method of one of examples 1 to 12, further including training the neural network by: initializing the neural network; and after initializing the neural network, feeding training data to the constrained L dimensional convolutional layer, where trainable weights of the constrained L dimensional convolutional layer include at least one of a slow-time cutoff frequency, a slow-time bandwidth, a fast-time cutoff frequency, and a fast-time bandwidth.

Example 14. The method of one of examples 1 to 13, further including normalizing the slow-time and fast-time cutoff frequencies, and normalizing the slow-time and fast-time bandwidths.

Example 15. The method of one of examples 1 to 14, further including training the neural network by: initializing the neural network; and after initializing the neural network, feeding a training data to the constrained L dimensional convolutional layer, where trainable weights of the constrained L dimensional convolutional layer include a center frequency and a standard deviation for each of the L dimensions.

Example 16. The method of one of examples 1 to 15, further including training the neural network for less than 21 epochs.

Example 17. The method of one of examples 1 to 16, where the plurality of additional layers includes a first maxpool layer followed by an unconstrained 2D convolutional layer followed by a second maxpool layer, followed by a dense layer, and followed by a softmax layer.

Example 18. The method of one of examples 1 to 17, where the target is a human target.

Example 19. The method of one of examples 1 to 18, where generating information about the target includes classifying the target based on a set of classes, and where the set of classes includes classes indicative of human activities.

Example 20. The method of one of examples 1 to 19, where the set of classes includes a walking class indicative of a human walking, an idle class indicative of an idle human, a random arm movements class indicative of a human exhibiting random arm movements, a waving class indicative of a human performing hand waving movements, and a working class indicative of a sitting human working with a computer.

Example 21. The method of one of examples 1 to 20, where the set of classes includes classes indicative of human gestures.

Example 22. The method of one of examples 1 to 21, where the set of classes includes a first class indicative of the presence of a human, and a second class indicative of the absence of a human.

Example 23. The method of one of examples 1 to 22, where the set of classes includes classes indicative of the number of humans present.

Example 24. The method of one of examples 1 to 23, further including tracking the target based on the generated information about the target.

Example 25. The method of one of examples 1 to 24, where the plurality of radar signals are a plurality of chirps.

Example 26. The method of one of examples 1 to 25, where the plurality of additional layer includes a first additional constrained convolutional layer.

Example 27. The method of one of examples 1 to 26, where generating information about the target includes generating a range-Doppler radar image indicative of a location of the target, the method further including processing the intermediate digital data using a second plurality of additional layers to generate a range-angle radar image indicative of the location of the target.

Example 28. A radar system including: a millimeter-wave radar sensor including: a transmitting antenna configured to transmit a plurality of radar signals towards a target; a receiving antenna configured to receive a plurality of reflected radar signals; a mixer configured to mix a replica of the plurality of transmitted radar signals with the plurality of received reflected radar signals to generate an intermediate frequency signal; an analog-to-digital converter (ADC) configured to generate, at an output of the ADC, raw digital data based on the intermediate frequency signal; and an artificial intelligence (AI) accelerator having an input coupled to the output of the ADC, and configured to: receive the raw digital data from the ADC, and process the raw digital data using a constrained L dimensional convolutional layer of a neural network to generate intermediate digital data, where L is a positive integer greater than or equal to 2, and where the neural network includes a plurality of additional layers; and process the intermediate digital data using the plurality of additional layers to generate, at an output of the AI accelerator, data associated with the target.

Example 29. The radar system of example 28, further including a digital signal processor (DSP) having an input coupled to the output of the AI accelerator, where the AI accelerator is directly connected to an output of the millimeter-wave radar sensor.

Example 30. The radar system of one of examples 28 or 29, where the DSP is configured to track a target based on the output of the AI accelerator.

Example 31. The radar system of one of examples 28 to 30, where the AI accelerator and the DSP are integrated in the same integrated circuit.

Example 32. A radar system including: a millimeter-wave radar configured to transmit a plurality of chirps towards a target, and to receive a plurality of reflected chirps; a mixer configured to mix a replica of the plurality of transmitted chirps with the plurality of received reflected chirps to generate an intermediate frequency signal; an analog-to-digital converter (ADC) configured to generate, at an output of the ADC, raw digital data based on the intermediate frequency signal; and a processor having an input coupled to the output of the ADC, and configured to: receive the raw digital data from the ADC, and process the raw digital data using a neural network having a first constrained two dimensional convolutional layer followed by a plurality of additional layers to generate, at an output of the plurality of additional layers, data associated with the target.

Example 33. The radar system of example 32, where the processor is an artificial intelligence (AI) accelerator.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    transmitting a plurality of sensor signals towards a target;
    receiving a plurality of reflected sensor signals that correspond to the plurality of transmitted sensor signals;
    producing raw digital data representing the reflected sensor signals;
    processing the raw digital data using a constrained L dimensional convolutional layer of a neural network to generate intermediate digital data, wherein L is a positive integer greater than or equal to 2, and wherein the neural network comprises a plurality of additional layers, and wherein processing the raw digital data comprises using a time-domain two-dimensional (2D) filter to filter the raw digital data in a fast time dimension and in a slow time dimension; and
    processing the intermediate digital data using the plurality of additional layers to generate information about the target.

2. The method of claim 1, wherein generating information about the target comprises classifying the target based on a set of classes.

3. The method of claim 1, wherein generating information about the target comprises providing a location of the target using a range-Doppler image (RAI), a range-angle image (RAI) or a Doppler-angle image (DAI).

4. The method of claim 1, wherein processing the raw digital data using the constrained L dimensional convolutional layer comprises processing the raw digital data using a 2D sinc filter of the constrained L dimensional convolutional layer.

5. The method of claim 1, wherein processing the raw digital data using the constrained L dimensional convolutional layer comprises processing the raw digital data using a 2D Morlet wavelet filter of the constrained L dimensional convolutional layer.

6. The method of claim 1, further comprising training the neural network by:
    initializing the neural network; and
    after initializing the neural network, feeding training data to the constrained L dimensional convolutional layer, wherein trainable weights of the constrained L dimensional convolutional layer comprise at least one of a slow-time cutoff frequency, a slow-time bandwidth, a fast-time cutoff frequency, and a fast-time bandwidth.

7. The method of claim 1, further comprising training the neural network by:
    initializing the neural network; and
    after initializing the neural network, feeding a training data to the constrained L dimensional convolutional layer, wherein trainable weights of the constrained L dimensional convolutional layer comprise a center frequency and a standard deviation for each dimension of the constrained L dimensional convolutional layer.

8. The method of claim 1, wherein the plurality of additional layers comprises a first maxpool layer followed by an unconstrained 2D convolutional layer followed by a second maxpool layer, followed by a dense layer, and followed by a softmax layer.

9. The method of claim 1, wherein the target is a human target.

10. The method of claim 9, wherein generating information about the target comprises classifying the target based on a set of classes, and wherein the set of classes comprises classes indicative of human activities.

11. The method of claim 1, further comprising tracking the target based on the generated information about the target.

12. The method of claim 1, wherein the plurality of sensor signals are a plurality of chirps.

13. The method of claim 1, wherein the plurality of additional layers comprises a first additional constrained convolutional layer.

14. The method of claim 1, wherein generating information about the target comprises generating a range-Doppler image indicative of a location of the target, the method further comprising processing the intermediate digital data using a second plurality of additional layers to generate a range-angle image indicative of the location of the target.

15. A system comprising:
    a sensor comprising:
        a transmitter configured to transmit a plurality of sensor signals towards a target;
        a receiver configured to receive a plurality of reflected sensor signals; and
    an artificial intelligence (AI) accelerator having an input coupled to an output of the sensor, and configured to:
        receive raw digital data representing the reflected sensor signal, and
        process the raw digital data using a constrained L dimensional convolutional layer of a neural network to generate intermediate digital data, wherein L is a positive integer greater than or equal to 2, and wherein the neural network comprises a plurality of additional layers, and wherein the AI accelerator is configured to process the raw digital data using a time-domain two-dimensional filter to filter the raw digital data in a fast time dimension and in a slow time dimension; and
        process the intermediate digital data using the plurality of additional layers to generate, at an output of the AI accelerator, data associated with the target.

16. The system of claim 15, further comprising a digital signal processor (DSP) having an input coupled to the output of the AI accelerator, wherein the AI accelerator is directly connected to the output of the sensor.

17. The system of claim 16, wherein the DSP is configured to track the target based on the output of the AI accelerator.

18. The system of claim 16, wherein the AI accelerator and the DSP are integrated in a same integrated circuit.

19. A system comprising:
    a sensor configured to transmit a plurality of chirps towards a target, receive a plurality of reflected chirps; and
    a processor having an input coupled to an output of the sensor, and configured to:
        receive raw digital data representing the received reflected chirps, and
        process the raw digital data using a neural network having a first constrained two dimensional convolutional layer followed by a plurality of additional layers to generate, at an output of the plurality of additional layers, data associated with the target, wherein the processor is configured to process the raw digital data using a time-domain two-dimensional filter to filter the raw digital data in a fast time dimension and in a slow time dimension.

20. The system of claim 19, wherein the processor is an artificial intelligence (AI) accelerator.

* * * * *